US012692685B2

(12) United States Patent
Ishii et al.

(10) Patent No.: US 12,692,685 B2
(45) Date of Patent: Jul. 28, 2026

(54) WORK MACHINE

(71) Applicant: HITACHI CONSTRUCTION MACHINERY CO., LTD., Tokyo (JP)

(72) Inventors: Hiroki Ishii, Tsuchiura (JP); Shinya Imura, Toride (JP); Shinjiro Yamamoto, Ami-Machi (JP); Koji Shiwaku, Tsuchiura (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 310 days.

(21) Appl. No.: 18/024,119

(22) PCT Filed: Feb. 28, 2022

(86) PCT No.: PCT/JP2022/008431

§ 371 (c)(1),
(2) Date: Mar. 1, 2023

(87) PCT Pub. No.: WO2022/196330

PCT Pub. Date: Sep. 22, 2022

(65) Prior Publication Data

US 2023/0304261 A1 Sep. 28, 2023

(30) Foreign Application Priority Data

Mar. 19, 2021 (JP) ................................ 2021-046321

(51) Int. Cl.
*E02F 9/20* (2006.01)
*E02F 9/22* (2006.01)
(Continued)

(52) U.S. Cl.
CPC .............. *E02F 9/205* (2013.01); *E02F 9/265* (2013.01); *G07C 5/02* (2013.01); *E02F 9/2228* (2013.01);
(Continued)

(58) Field of Classification Search
CPC ......... E02F 9/205; E02F 9/265; E02F 9/2228; E02F 9/2285; E02F 9/2292; E02F 9/2296;
(Continued)

(56) References Cited

U.S. PATENT DOCUMENTS 6,363,632 B1 4/2002 Stentz et al.
2017/0028922 A1* 2/2017 Matsuo .................. B60R 1/002
(Continued)

FOREIGN PATENT DOCUMENTS

JP 10-1968 A 1/1998
JP 2000-136549 A 5/2000
(Continued)

OTHER PUBLICATIONS

English Translation for JP-2020180452-A (Year: 2020).*
(Continued)

*Primary Examiner* — Faris S Almatrahi
*Assistant Examiner* — Moises Gasca Alva
(74) *Attorney, Agent, or Firm* — MATTINGLY & MALUR, PC

(57) ABSTRACT

A work machine includes: a work device; a posture sensor that senses posture information of the work device; a hydraulic actuator that drives the work device; and a controller configured to generate operation plan information on the basis of task information necessary for automatic control, the task information being obtained from an external system, and perform automatic control of the hydraulic actuator on the basis of the operation plan information and a sensing result of the posture sensor. The controller outputs the operation plan information to the external system. The controller does not perform the automatic control when an approval signal indicating that the operation plan information is approved is not input from the external system. The
(Continued)

controller performs the automatic control when the approval signal is input from the external system.

6 Claims, 8 Drawing Sheets

(51) Int. Cl.
*E02F 9/26* (2006.01)
*G07C 5/02* (2006.01)

(52) U.S. Cl.
CPC ........... *E02F 9/2285* (2013.01); *E02F 9/2292* (2013.01); *E02F 9/2296* (2013.01)

(58) Field of Classification Search
CPC ......... E02F 3/437; E02F 3/439; E02F 9/2033; E02F 9/262; E02F 3/43; E02F 9/268; E02F 9/2004; E02F 9/2025; E02F 9/2058; E02F 9/26; G07C 5/02; B60Y 2200/412
See application file for complete search history.

(56) References Cited

U.S. PATENT DOCUMENTS

| | | | | |
|---|---|---|---|---|
| 2017/0328030 | A1* | 11/2017 | Yamada | E02F 9/205 |
| 2019/0218745 | A1* | 7/2019 | Hashimoto | E02F 3/815 |
| 2020/0354921 | A1* | 11/2020 | Nishi | E02F 9/123 |
| 2020/0407949 | A1* | 12/2020 | Aizawa | E02F 9/2041 |
| 2021/0002851 | A1 | 1/2021 | Morita | |
| 2021/0002852 | A1* | 1/2021 | Nishi | E02F 9/2282 |
| 2021/0034058 | A1* | 2/2021 | Subramanian | G06T 17/05 |
| 2021/0246627 | A1* | 8/2021 | Konda | E02F 3/651 |
| 2022/0074168 | A1* | 3/2022 | Yamada | E02F 9/123 |
| 2022/0106769 | A1 | 4/2022 | Takaoka | |

FOREIGN PATENT DOCUMENTS

| | | | | | |
|---|---|---|---|---|---|
| JP | 2019181872 | A | | 9/2019 | |
| JP | 2019-185279 | A | | 10/2019 | |
| JP | 2020-002709 | A | | 1/2020 | |
| JP | 2020-020153 | A | | 2/2020 | |
| JP | 2020180452 | A | * | 11/2020 | E02F 3/7618 |
| KR | 10-2012-0004132 | A | | 1/2012 | |
| KR | 20200134250 | A | * | 12/2020 | |
| WO | 2019/181872 | A1 | | 9/2019 | |

OTHER PUBLICATIONS

English Translation for KR-20200134250-A (Year: 2020).*
Korean Office Action received in corresponding Korean Application No. 10-2023-7007402 dated Aug. 19, 2024.
International Preliminary Report on Patentability received in corresponding International Application No. PCT/JP2022/008431 dated Sep. 28, 2023.
International Search Report of PCT/JP2022/008431 dated May 24, 2022.

* cited by examiner

WORK MACHINE

TECHNICAL FIELD

The present invention relates to a work machine.

BACKGROUND ART

There is work in which soil is excavated by a work machine such as a hydraulic excavator and the excavated soil is loaded onto a transportation vehicle such as a dump truck or the like. A technology for performing such excavation and loading work by automatic control is known.

Patent Document 1 discloses a control system that automatically plans and performs a task related to excavation and loading work on the basis of terrain profile data measured by using a sensor system mounted in a hydraulic excavator. This control system measures necessary parts of an excavation area, a movement path, and a load area by using two scanning sensors before and after completion of excavation work and before and after completion of loading work, and plans and performs the task automatically on the basis of the measured data.

Patent Document 2 discloses a work machine including a controller that determines a swing path connecting a present position of a work implement to an excavation start position on the basis of measured terrain profile data, and moves the work implement to the excavation start position according to the swing path.

PRIOR ART DOCUMENT

Patent Documents

Patent Document 1: JP-2000-136549-A
Patent Document 2: JP-2020-020153-A

SUMMARY OF THE INVENTION

Problem to be Solved by the Invention

In the technologies described in Patent Document 1 and Patent Document 2, the controller automatically performs processing from the planning of an operation of the work machine to control of the operation of the work machine on the basis of the plan. Therefore, an operation not intended by a manager may be performed by the work machine.

It is an object of the present invention to provide a work machine that can appropriately perform an operation intended by a manager.

Means for Solving the Problem

A work machine according to one aspect of the present invention includes: a work device; a posture sensor that senses posture information of the work device; a hydraulic actuator that drives the work device; and a controller configured to generate operation plan information on a basis of task information necessary for automatic control, the task information being obtained from an external system, and perform automatic control of the hydraulic actuator on a basis of the operation plan information and a sensing result of the posture sensor. The controller is configured to output the operation plan information to the external system, not perform the automatic control when an approval signal indicating that the operation plan information is approved is not input from the external system, and perform the automatic control when the approval signal is input from the external system.

Advantages of the Invention

According to the present invention, it is possible to provide a work machine that can appropriately perform an operation intended by a manager.

MODES FOR CARRYING OUT THE INVENTION

Figure 1:
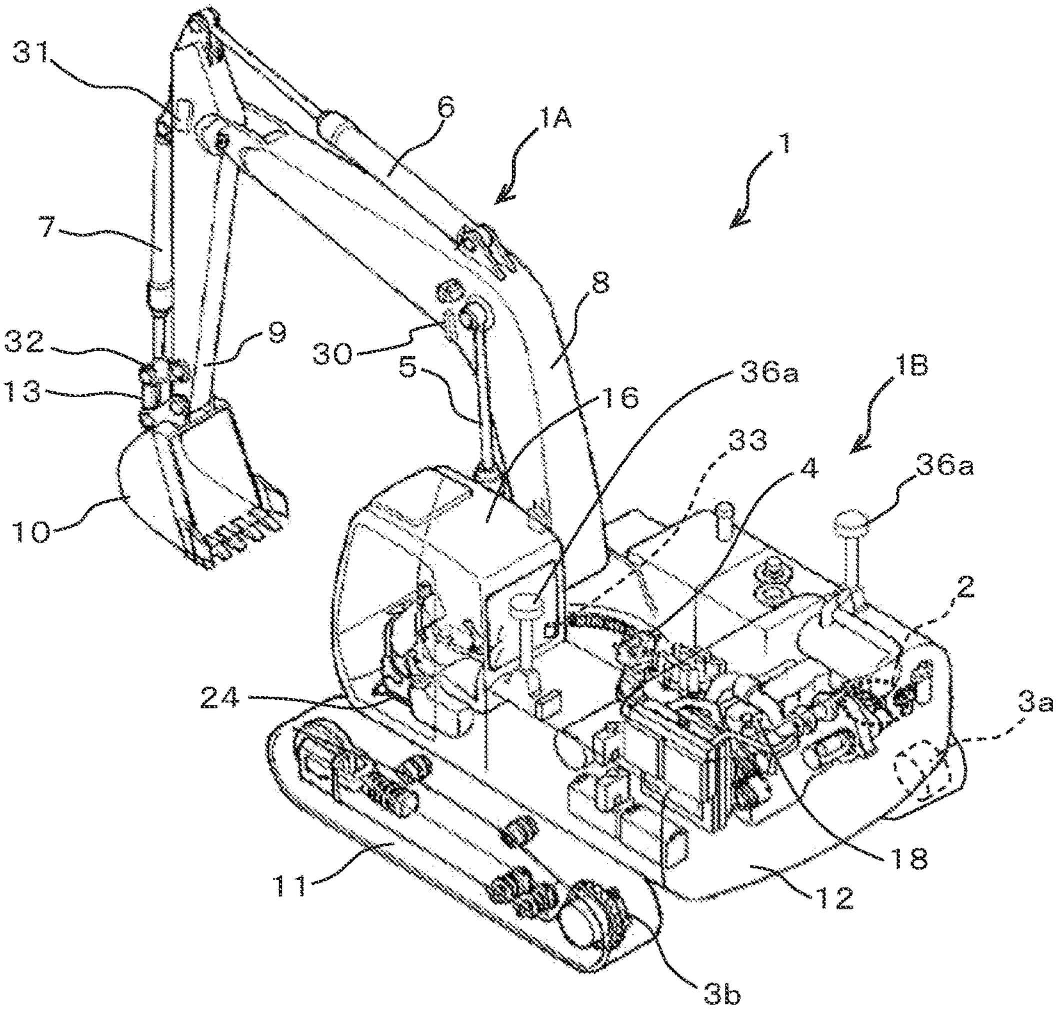
FIG. 1 is a configuration diagram of a hydraulic excavator according to a first embodiment of the present invention.

A work machine according to an embodiment of the present invention will hereinafter be described with reference to the drawings. Incidentally, in the following, description will be made of an example in which the work machine is a hydraulic excavator having a bucket 10 as a work tool (attachment) at a distal end of a work device.

In addition, in the present document, in cases where there are a plurality of identical constituent elements, alphabetic characters may be attached to ends of reference numerals (numbers) thereof. However, the plurality of constituent elements may be denoted collectively with the alphabetic characters omitted. For example, when there are two solenoid proportional valves 54*a* and 54*b*, these solenoid proportional valves may be denoted collectively as solenoid proportional valves 54.

First Embodiment

—General Configuration of Hydraulic Excavator—

FIG. 1 is a configuration diagram of a hydraulic excavator 1 according to a first embodiment of the present invention. As shown in FIG. 1, the hydraulic excavator 1 includes a machine body 1B and an articulated front work device (hereinafter written simply as a work device) 1A attached to the machine body 1B. The machine body 1B includes a lower track structure 11 made to travel by a left and a right travelling hydraulic motor 3*a* and 3*b* and an upper swing structure 12 attached onto the lower track structure 11 and swung by a swing hydraulic motor 4.

The work device 1A includes a plurality of driven members (a boom 8, an arm 9, and a bucket 10) and a plurality of hydraulic actuators that drive the driven members. The plurality of driven members are coupled in series with each other. A proximal end portion of the boom 8 is pivotably supported on a front portion of the upper swing structure 12 via a boom pin. The arm 9 is pivotably coupled with a distal end portion of the boom 8 via an arm pin. The bucket 10 as a work tool is pivotably coupled with a distal end portion of the arm 9 via a bucket pin. The boom 8 is driven by a hydraulic cylinder (hereinafter also written as a boom cylinder) 5 as a hydraulic actuator. The arm 9 is driven by a hydraulic cylinder (hereinafter also written as an arm cylinder) 6 as a hydraulic actuator. The bucket 10 is driven by a hydraulic cylinder (hereinafter also written as a bucket cylinder) 7 as a hydraulic actuator.

In order to be able to measure the pivot rotational angles of the boom 8, the arm 9, and the bucket 10, a boom angle sensor 30 is attached to the boom 8, an arm angle sensor 31 is attached to the arm 9, and a bucket angle sensor 32 is attached to a bucket link 13. A machine body inclination angle sensor 33 that senses the inclination angle of the upper swing structure 12 (machine body 1B) with respect to a reference plane (for example, a horizontal plane) is attached to the upper swing structure 12.

Figure 2:
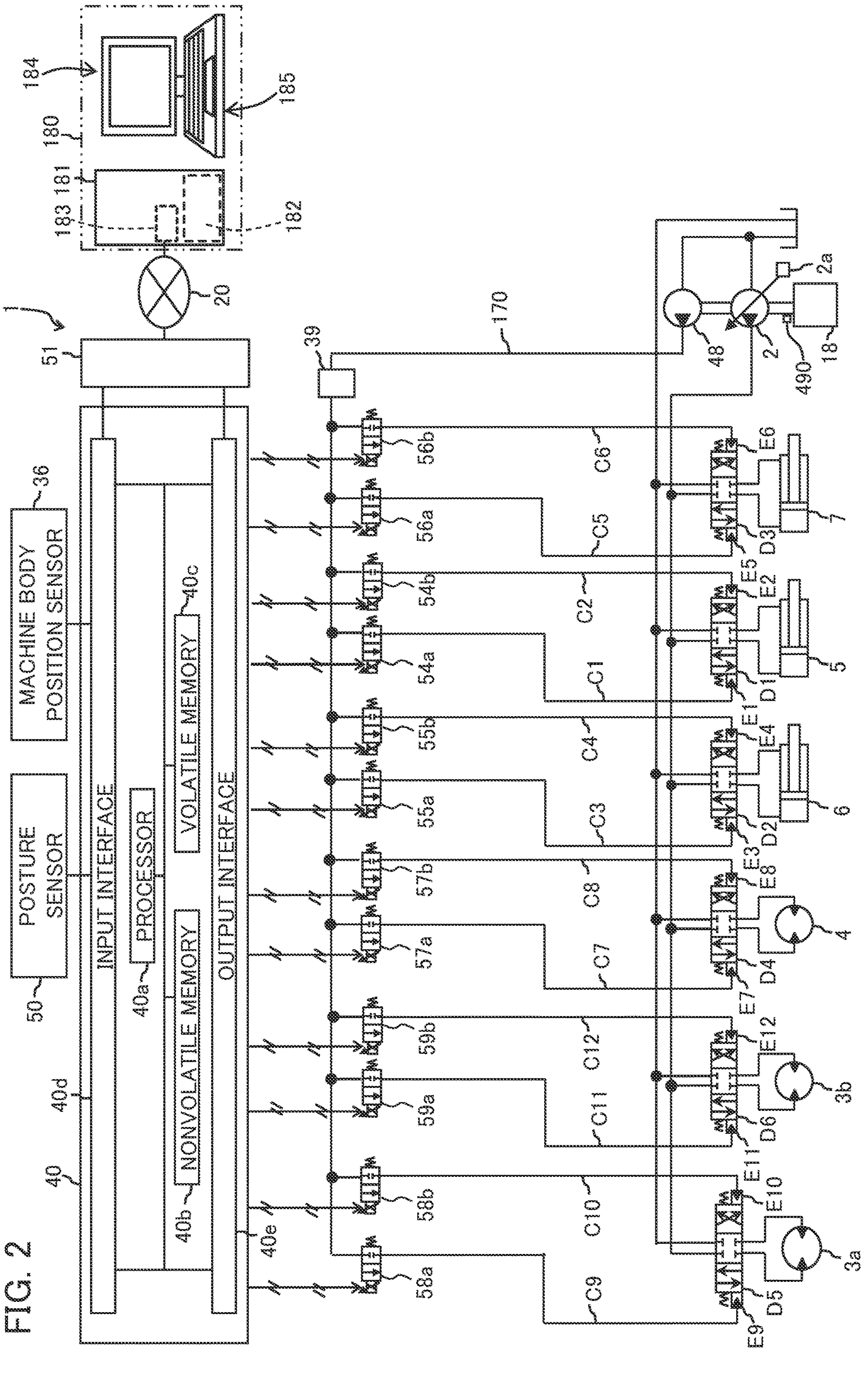
FIG. 2 is a diagram showing a hydraulic drive system of the hydraulic excavator according to the first embodiment of the present invention.

The upper swing structure 12 is mounted with hydraulic devices such as an engine 18 as a prime mover and hydraulic pumps driven by the engine 18. FIG. 2 is a diagram showing a hydraulic drive system of the hydraulic excavator 1. As shown in FIG. 2, the hydraulic drive system includes the engine 18, a main pump 2, a pilot pump 48, a plurality of flow control valves D1 to D6, and a plurality of solenoid proportional valves 54*a* to 59*b*. The engine 18 drives the main pump 2 and the pilot pump 48. The pilot pump 48 is a fixed displacement hydraulic pump.

The main pump 2 is a variable displacement hydraulic pump whose displacement is controlled by a regulator 2*a*. The main pump 2 delivers hydraulic fluid that drives the plurality of hydraulic actuators (the boom cylinder 5, the arm cylinder 6, the bucket cylinder 7, and the like). The regulator 2*a* is driven by a control command from a controller 40 mounted in the upper swing structure 12, and controls the delivery flow rate of the main pump 2.

The hydraulic fluid delivered from the main pump 2 is supplied to the boom cylinder 5 through the flow control valve D1, is supplied to the arm cylinder 6 through the flow control valve D2, is supplied to the bucket cylinder 7 through the flow control valve D3, is supplied to the swing hydraulic motor 4 through the flow control valve D4, is supplied to the travelling hydraulic motor 3*a* through the flow control valve D5, and is supplied to the travelling hydraulic motor 3*b* through the flow control valve D6. When the boom cylinder 5, the arm cylinder 6, and the bucket cylinder 7 are elongated or contracted by the supplied hydraulic fluid, each of the boom 8, the arm 9, and the bucket 10 pivotably rotate, and consequently the posture of the work device 1A and the position of the bucket 10 are changed. When the swing hydraulic motor 4 is rotated by the supplied hydraulic fluid, the upper swing structure 12 swings with respect to the lower track structure 11. When the travelling hydraulic motors 3*a* and 3*b* are rotated by the supplied hydraulic fluid, the lower track structure 11 travels.

A lock valve 39 is provided to a pilot pump line 170 as a delivery pipe of the pilot pump 48. A downstream side of the lock valve 39 in the pilot pump line 170 is branched into a plurality of pilot lines C1 to C12, which are connected to the solenoid proportional valves 54*a* to 59*b*. The lock valve 39 in the present embodiment is a solenoid selector valve. A solenoid of the solenoid selector valve is electrically connected to a position sensor of a gate lock lever 24 (see FIG. 1) disposed in a cab 16 (see FIG. 1) of the upper swing structure 12. The position of the gate lock lever 24 is sensed by the position sensor, and a signal corresponding to the position of the gate lock lever 24 is input from the position sensor to the lock valve 39. When the position of the gate lock lever 24 is at a lock position, the lock valve 39 is closed, and thus the supply of hydraulic operating fluid from the pilot pump 48 to the solenoid proportional valves 54*a* to 59*b* is interrupted. When the position of the gate lock lever 24 is at a lock release position, the lock valve 39 is opened, and thus the hydraulic operating fluid is supplied from the pilot pump 48 to the solenoid proportional valves 54*a* to 59*b*. That is, operation of each of the hydraulic actuators (3 to 7) is disabled in a state in which the pilot pump line 170 is interrupted by the lock valve 39.

The flow control valves D1 to D6 control flows of the hydraulic fluid supplied from the main pump 2 to the boom cylinder 5, the arm cylinder 6, the bucket cylinder 7, the swing hydraulic motor 4, and the travelling hydraulic motors 3*a* and 3*b*.

The flow control valve D1 is driven by pilot pressures input to pressure receiving chambers E1 and E2 via the pilot lines C1 and C2 provided with the solenoid proportional valves 54*a* and 54*b*. The flow control valve D1 drives the boom cylinder 5 while controlling a supply direction and a flow rate of the hydraulic fluid from the main pump 2. The flow control valve D2 is driven by pilot pressures input to pressure receiving chambers E3 and E4 via the pilot lines C3 and C4 provided with the solenoid proportional valves 55*a* and 55*b*. The flow control valve D2 drives the arm cylinder 6 while controlling a supply direction and a flow rate of the hydraulic fluid from the main pump 2. The flow control valve D3 is driven by pilot pressures input to pressure receiving chambers E5 and E6 via the pilot lines C5 and C6 provided with the solenoid proportional valves 56*a* and 56*b*. The flow control valve D3 drives the bucket cylinder 7 while controlling a supply direction and a flow rate of the hydraulic fluid from the main pump 2. The flow control valve D4 is driven by pilot pressures input to pressure receiving chambers E7 and E8 via the pilot lines C7 and C8 provided with the solenoid proportional valves 57*a* and 57*b*. The flow control valve D4 drives the swing hydraulic motor 4 while controlling a supply direction and a flow rate of the hydraulic fluid from the main pump 2. The flow control valve D5 is driven by pilot pressures input to pressure receiving chambers E9 and E10 via the pilot lines C9 and C10 provided with the solenoid proportional valves 58*a* and 58*b*. The flow control valve D5 drives the travelling hydraulic motor 3*a* while controlling a supply direction and a flow rate of the hydraulic fluid from the main pump 2. The flow control valve D6 is driven by pilot pressures input to pressure receiving chambers E11 and E12 via the pilot lines C11 and C12 provided with the solenoid proportional valves 59*a* and 59*b*. The flow control valve D6 drives the travelling hydraulic motor 3*b* while controlling a supply direction and a flow rate of the hydraulic fluid from the main pump 2.

The solenoid proportional valves 54*a* to 59*b* are controlled by control commands from the controller 40. The solenoid proportional valves 54*a* to 59*b* are pressure reducing valves that generate pilot pressures by reducing a primary pressure supplied from the pilot pump 48 to secondary pressures corresponding to the control commands (control currents) from the controller 40. The solenoid proportional valves 54*a* to 59*b* output the generated pilot pressures to the pressure receiving chambers (E1 to E12) of the flow control valves D1 to D6.

The controller 40 is connected with a posture sensor 50, a machine body position sensor 36, and a communicating device 51. The posture sensor 50 includes the boom angle sensor 30 (see FIG. 1) attached to the boom 8, the arm angle sensor 31 (see FIG. 1) attached to the arm 9, the bucket angle sensor 32 (see FIG. 1) attached to the bucket 10, and the machine body inclination angle sensor 33 (see FIG. 1) attached to the machine body 1B. These angle sensors (30, 31, 32, and 33) obtain information indicating the angles as posture information of the work device 1A, and output signals corresponding to the information. That is, the angle sensors (30, 31, 32, and 33) function as posture sensors that sense the posture information of the work device 1A. The posture sensor 50, for example, includes, as the angle sensors (30, 31, 32, and 33), IMUs (Inertial Measurement Units) that obtain angular velocities and accelerations on three orthogonal axes and angle computing devices that compute the boom angle, the arm angle, the bucket angle, and the machine body inclination angle on the basis of information obtained by the IMUs. Incidentally, potentiometers can also be employed as the angle sensors (30, 31, and 32).

The machine body position sensor 36 is attached to the upper swing structure 12 to sense positional information and azimuth information of the upper swing structure 12 (machine body 1B). For example, the machine body position sensor 36 includes a plurality of GNSS (Global Navigation Satellite System) antennas (hereinafter written as GNSS antennas) 36*a* (see FIG. 1) and a positioning computing device that computes the position coordinates (positional information) of the upper swing structure 12 in a geographic coordinate system (global coordinate system) and the azimuth angle (azimuth information) of the upper swing structure 12 which azimuth angle is an angle from a reference azimuth on the basis of satellite signals (GNSS radio waves) from a plurality of positioning satellites which satellite signals are received by the GNSS antennas 36*a*.

The communicating device 51 is a device for communicating with a management system 180. The controller 40 transmits information to the management system 180 via the communicating device 51, and receives information from the management system 180 via the communicating device 51. The communicating device 51 is a wireless communication device capable of performing wireless communication with a communication line 20 as a wide area network. The communicating device 51 has a communication interface including a communication antenna having a predetermined frequency band as a sensing band. The communication line 20 is a mobile telephone communication network (mobile communication network) operated by a mobile telephone operator or the like, the Internet, or the like. Incidentally, the communicating device 51 may send and receive information to and from the management system 180 directly or indirectly by using a communication system such as Wi-Fi (registered trademark), ZigBee (registered trademark), or Bluetooth (registered trademark).

The management system 180 is an external system that remotely manages (grasps and monitors) the state of the hydraulic excavator 1. The management system 180 is provided in a facility remote from the hydraulic excavator 1. The management system 180 includes a management server 181, a display device 184, and an input device 185. The management server 181 includes a communicating device 183 for communicating with the hydraulic excavator 1 via the communication line 20 and a storage device 182 such as a hard disk drive that stores information received from the hydraulic excavator 1, and the like. The management server 181 transmits information to the controller 40 via the communicating device 183, and receives information from the controller 40 via the communicating device 183. The management server 181 displays the information stored in the storage device 182 on the display device 184 such as a liquid crystal display device. A manager can grasp the state of the hydraulic excavator 1 by operating the management server 181 by the input device 185 such as a keyboard and a mouse, and displaying information of the predetermined hydraulic excavator 1 on the display device 184.

The manager operates the input device 185 to perform an input operation for task information necessary for automatic control to be performed by the controller 40 of the hydraulic excavator 1. The task information includes a kind of automatic control and a parameter for making the automatic control performed. Kinds of automatic control include, for example, excavation work, loading work, vehicle movement, excavation and loading work, movement, excavation, and loading work, and the like. An example of the parameter for making the automatic control performed will be described. As the parameter for making the automatic control of the excavation work performed, there are position coordinates in the geographic coordinate system of eight vertices for defining an excavation range in a rectangular parallelepipedic shape. As the parameter for making the automatic control of the loading work performed, there are position coordinates in the geographic coordinate system of a soil discharge point.

When the input operation for the task information by the input device 185 is performed, the management server 181 generates the task information, and transmits the task information to the hydraulic excavator 1 via the communicating device 183. For example, the manager selects the excavation and loading work as a kind of automatic control and performs an operation of inputting the position coordinates of the eight vertices of an area to be excavated and the position coordinates of the soil discharge point when the manager desires the hydraulic excavator 1 to perform the excavation and loading work. Thus, the management server 181 generates and outputs the task information in which the automatic control for a set of work from an excavation operation to a loading operation (soil discharge operation) by the hydraulic excavator 1 is set as one task.

The controller 40 of the hydraulic excavator 1 generates operation plan information on the basis of the task information and transmits the operation plan information to the management system 180 via the communicating device 51 when the controller 40 receives the task information from the management system 180. Incidentally, details of contents of processing of generating the operation plan information by the controller 40 of the hydraulic excavator 1 will be described later.

The operation plan information generated by the controller 40 is input to the management system 180. The management server 181 displays the input operation plan information on the display device 184. When the manager visually checks the operation plan information displayed on a display screen of the display device 184, and approves the execution of the automatic control based on the operation plan information, the manager performs an approval operation by the input device 185. When the approval operation by the input device 185 is performed, the management server 181 generates an approval signal indicating that the operation plan information is approved, and transmits the approval signal to the hydraulic excavator 1 via the communicating device 183. When the manager visually checks the operation plan information displayed on the display screen of the display device 184, and does not approve the execution of the automatic control based on the operation plan information, the manager performs a disapproval operation by the input device 185. When the disapproval operation by the input device 185 is performed, the management server 181 generates a disapproval signal indicating that the operation plan information is not approved, and transmits the disapproval signal to the hydraulic excavator 1 via the communicating device 183. That is, the management system 180 outputs the approval signal or the disapproval signal according to the operation of the input device 185.

The controller 40 performs the automatic control of the hydraulic actuator on the basis of the operation plan information and a sensing result of the posture sensor 50 when the approval signal from the management system 180 is input to the controller 40 of the hydraulic excavator 1. Incidentally, the controller 40 does not perform the automatic control when the approval signal is not input from the management system 180. When the automatic control is ended normally, the controller 40 generates a normal end signal, and transmits the normal end signal to the management system 180 via the communicating device 51.

The management server 181 displays an image of a message or the like indicating that the automatic control is ended normally on the display screen of the display device 184 when the management server 181 receives the normal end signal. The manager performs an input operation for task information again when the manager confirms that the automatic control is ended normally. Thus, in the present embodiment, work using the hydraulic excavator 1 is progressed by repeating (1) an input operation for task information by the manager, (2) the generation of operation plan information by the controller 40 of the hydraulic excavator 1, (3) an approval operation for the operation plan information by the manager, and (4) the automatic control based on the operation plan information by the controller 40 of the hydraulic excavator 1.

The management server 181 displays a message indicating that the automatic control is being performed on the display screen of the display device 184 when the management server 181 receives information indicating that the automatic control is being performed from the hydraulic excavator 1. The manager makes a temporary stop request operation by the input device 185 when the manager desires to temporarily stop the automatic control. The management server 181 generates a temporary stop request signal and transmits the temporary stop request signal to the hydraulic excavator 1 via the communicating device 183 when the temporary stop request operation is performed by the input device 185. The manager makes a resumption request operation by the input device 185 when the manager desires to make the automatic control performed again after temporarily stopping the automatic control. The management server 181 generates a resumption request signal and transmits the resumption request signal to the hydraulic excavator 1 via the communicating device 183 when the resumption request operation is performed by the input device 185. The manager performs a halfway termination request operation by the input device 185 when the manager desires to terminate the automatic control halfway after temporarily stopping the automatic control. The management server 181 generates a halfway termination request signal and transmits the halfway termination request signal to the hydraulic excavator 1 via the communicating device 183 when the halfway termination request operation is performed by the input device 185.

In the following, detailed description will be made of a configuration, functions, and a flow of processing of automatic operation control of the controller 40 for realizing the automatic control.

—Hardware Configuration of Controller—

The controller 40 is a controller that performs the automatic control of the hydraulic excavator 1 on the basis of operation plan information. The controller 40 is constituted by a computer including a processor 40*a* such as a CPU (Central Processing Unit), an MPU (Micro Processing Unit), or a DSP (Digital Signal Processor), a nonvolatile memory 40*b* such as a ROM (Read Only Memory), a flash memory, and a hard disk drive, a volatile memory 40*c* referred to as a so-called RAM (Random Access Memory), an input interface 40*d*, an output interface 40*e*, and other peripheral circuits. Incidentally, the controller 40 may be constituted by one computer, or may be constituted by a plurality of computers.

The nonvolatile memory 40*b* stores a program that can perform various kinds of computations. That is, the nonvolatile memory 40*b* is a storage medium from which the program for implementing functions of the present embodiment is readable. The processor 40*a* is a processing device that expands the program stored in the nonvolatile memory 40*b* into the volatile memory 40*c*, and computes and executes the program. The processor 40*a* performs predetermined computation processing on data taken in from the input interface 40*d*, the nonvolatile memory 40*b*, and the volatile memory 40*c* according to the program.

The input interface 40*d* converts signals input from devices such as the posture sensor 50, the machine body position sensor 36, and the communicating device 51 into data that can be computed by the processor 40*a*. The output interface 40*e* generates signals for output according to a computation result of the processor 40*a*, and outputs the signals to devices such as the solenoid proportional valves 54*a* to 59*b* and the communicating device 51.

—Functions of Controller—

Figure 3:
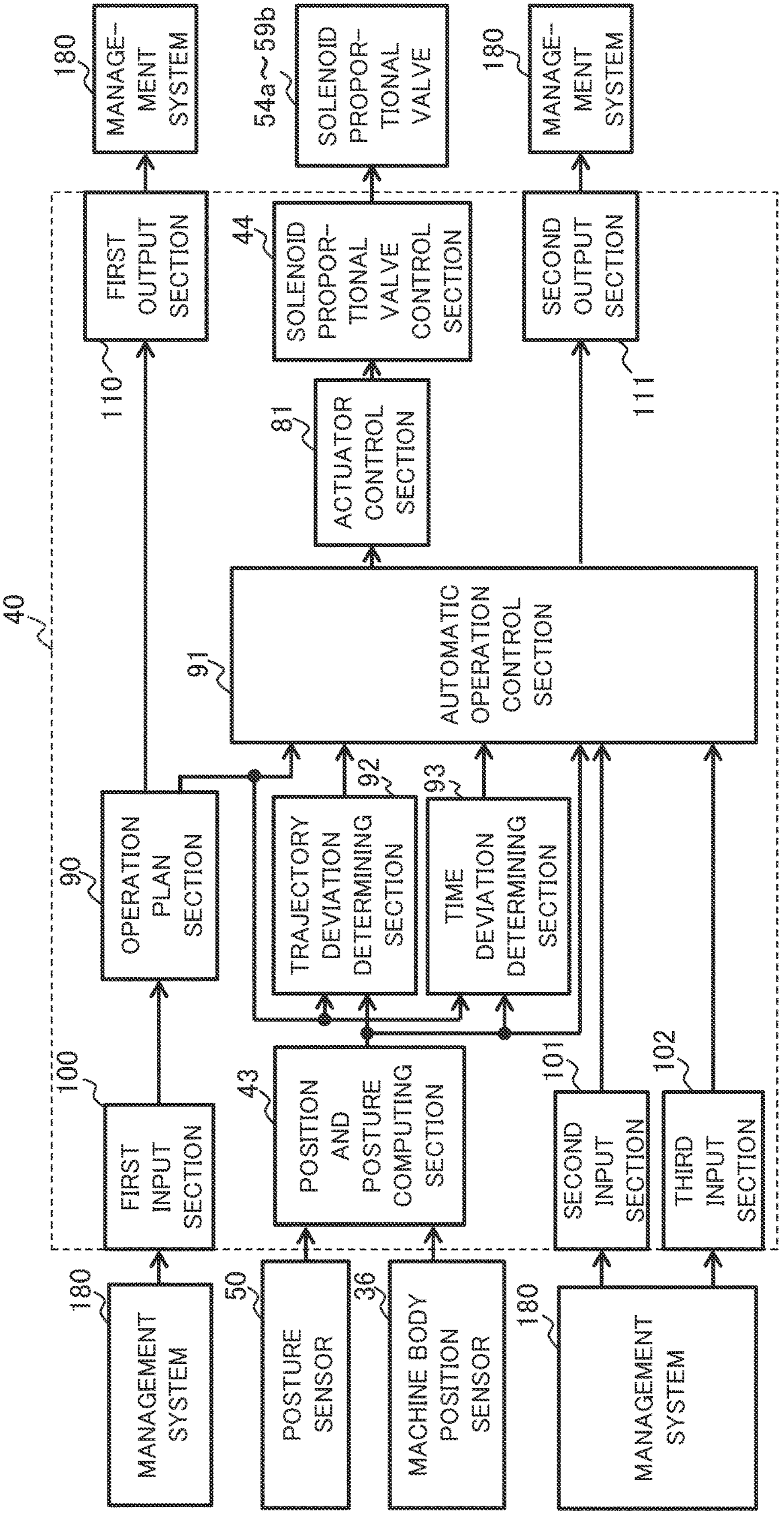
FIG. 3 is a functional block diagram of a controller according to the first embodiment of the present invention.

FIG. 3 is a functional block diagram of the controller 40. The controller 40 includes a position and posture computing section 43, a solenoid proportional valve control section 44, an actuator control section 81, an operation plan section 90, an automatic operation control section 91, a trajectory deviation determining section 92, a time deviation determining section 93, a first input section 100, a second input section 101, a third input section 102, a first output section 110, and a second output section 111. Incidentally, in FIG. 3, the communicating device 51 is not shown. The transmission of information by the controller 40 to the management system 180 via the communicating device 51 will also be written simply as the output of the information to the management system 180. In addition, the reception of information by the controller 40 from the management system 180 via the communicating device 51 will also be written simply as the input of the information from the management system 180.

The first input section 100 is supplied with the task information from the management system 180. The second input section 101 is supplied with the approval signal or the disapproval signal from the management system 180. The third input section 102 is supplied with the temporary stop request signal, the resumption request signal, or the halfway termination request signal from the management system 180.

The position and posture computing section 43 computes the position and the azimuth angle of the upper swing structure 12 in the geographic coordinate system on the basis of a sensing result of the machine body position sensor 36, and on the basis of a result of the computation and the sensing result of the posture sensor 50, computes the position and posture of the work device 1A in the geographic coordinate system.

The operation plan section 90 generates operation plan information on the basis of the task information obtained by the first input section 100. The operation plan information includes: a planned operation trajectory as a trajectory of a specific point of the work device 1A in the geographic coordinate system; time series information of a planned position of the specific point of the work device 1A in the geographic coordinate system; time series information of a planned posture of the work device 1A; and time series information of a planned position of the machine body 1B in the geographic coordinate system. In the present embodiment, the specific point of the work device 1A is a central point in a left-right width direction at a claw tip of the bucket 10. The time series information of the planned position of the specific point of the work device 1A is planned position coordinates of the specific point of the work device 1A at each of planned times at predetermined time intervals from a start to an end of a task. The time series information of the planned posture of the work device 1A is the boom angle, the arm angle, and the bucket angle at each of the planned times at the predetermined time intervals from the start to the end of the task. The time series information of the planned position of the machine body 1B is planned position coordinates of a reference point of the machine body 1B at each of the planned times at the predetermined time intervals from the start to the end of the task. An optional point can be adopted as the reference point of the machine body 1B of the hydraulic excavator 1. In the present embodiment, the reference point of the machine body 1B is a point of intersection of the lower surface of the lower track structure 11 and a swing central axis. Incidentally, the planned operation trajectory of the work device 1A may be formed by a plurality of position coordinates, or may be formed by a function.

The first output section 110 outputs the operation plan information generated by the operation plan section 90 to the management system 180.

The automatic operation control section 91 determines whether or not the approval signal is input to the second input section 101. The automatic operation control section 91 computes a target value of the velocity of each hydraulic actuator (hereinafter written as a target velocity) on the basis of the operation plan information generated by the operation plan section 90 and the position and posture of the hydraulic excavator 1 (the positions and postures of the work device 1A, the upper swing structure 12, and the lower track structure 11) which position and posture are computed by the position and posture computing section 43 when the automatic operation control section 91 determines that the approval signal is input to the second input section 101.

For example, when the work device 1A is to be driven, the automatic operation control section 91 computes the target velocities of the hydraulic cylinders (5, 6, and 7) that drive the work device 1A on the basis of the operation plan information and the position and posture of the work device 1A. When the upper swing structure 12 is to be driven, the automatic operation control section 91 computes the target velocity of the swing hydraulic motor 4 that drives the upper swing structure 12 on the basis of the operation plan information and the position and posture of the upper swing structure 12. When the lower track structure 11 is to be driven, the automatic operation control section 91 computes the target velocities of the travelling hydraulic motors 3*a* and 3*b* that drive the lower track structure 11 on the basis of the operation plan information and the position and posture of the lower track structure 11.

The actuator control section 81 computes target values of the pilot pressures (hereinafter written as target pilot pressures) made to act on the pressure receiving chambers E1 to E12 of the flow control valves D1 to D6 which chambers correspond to operation directions of the respective hydraulic actuators on the basis of the target velocity of each hydraulic actuator (3 to 7) which target velocity is computed by the automatic operation control section 91. The solenoid proportional valve control section 44 computes control current values to be supplied to the solenoids of the respective solenoid proportional valves 54*a* to 59*b* on the basis of the target pilot pressures computed by the actuator control section 81, and supplies control currents corresponding to computation results to the solenoids of the respective solenoid proportional valves 54*a* to 59*b*.

Figure 4:
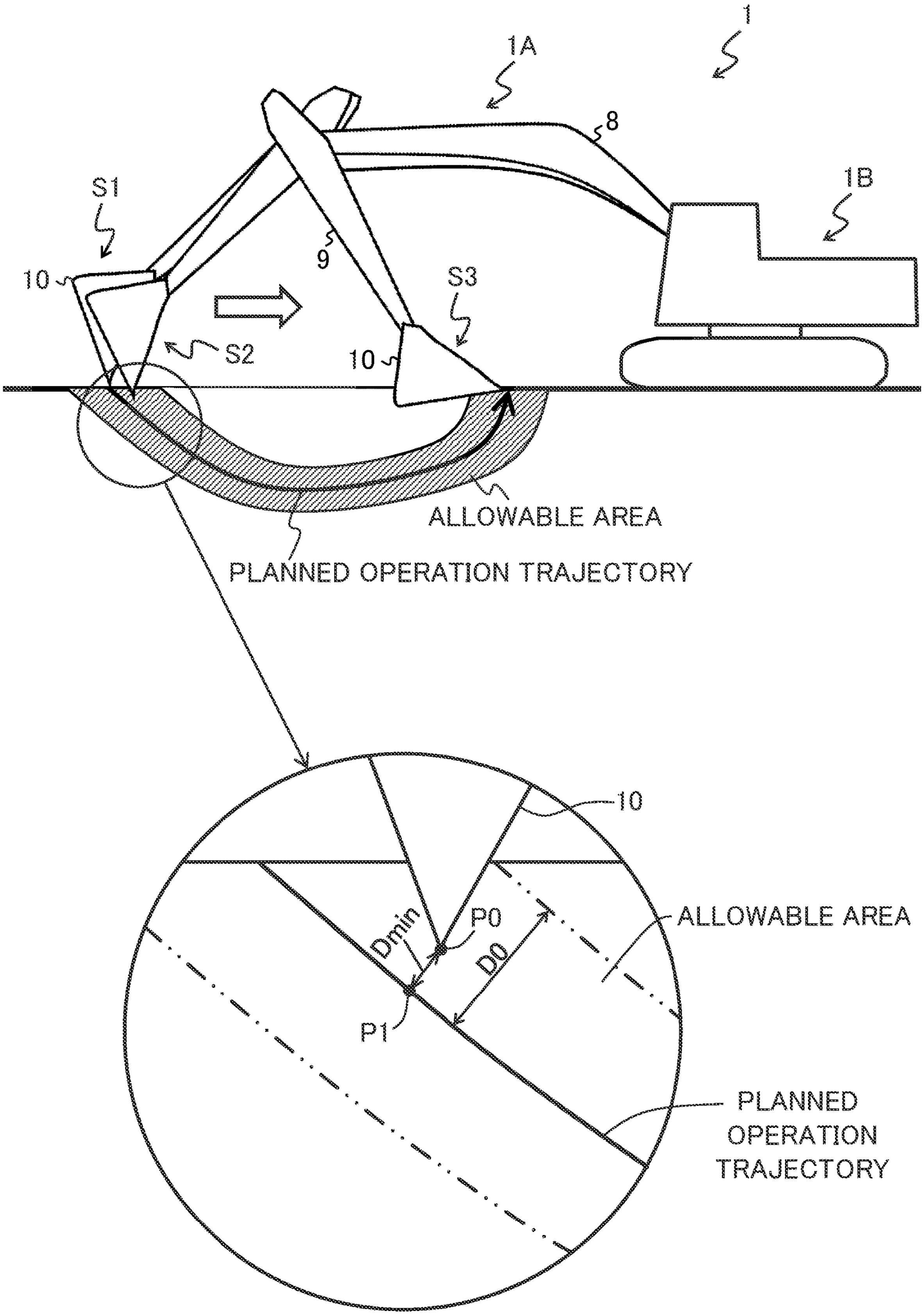
FIG. 4 is a diagram showing a planned operation trajectory when excavation work is performed as well as a work device in which a claw tip of a bucket operates so as to follow the planned operation trajectory.

FIG. 4 is a diagram showing the planned operation trajectory when excavation work is performed as well as the work device 1A in which the claw tip of the bucket 10 operates so as to follow the planned operation trajectory. As shown in FIG. 4, when the control currents (control commands) from the controller 40 to the respective solenoid proportional valves 54*a* to 59*b* are output, the respective hydraulic actuators operate, and the work device 1A operates so as to follow the planned operation trajectory. Here, due to an effect of soil to be excavated, or the like, the claw tip of the bucket 10 may deviate from the planned operation trajectory, or the movement velocity of the claw tip of the bucket 10 may become slow. In the present embodiment, the trajectory deviation determining section 92 and the time deviation determining section 93 shown in FIG. 3 monitor whether or not an actual operation of the work device 1A deviates with respect to the operation plan information.

The trajectory deviation determining section 92 determines whether or not the specific point of the work device 1A deviates from the planned operation trajectory at least during the execution of the automatic control. The trajectory deviation determining section 92 determines whether or not the specific point of the bucket 10 deviates from the planned operation trajectory on the basis of the operation plan information generated by the operation plan section 90 and a computation result in the position and posture computing section 43. That is, the trajectory deviation determining section 92 determines whether or not there is a positional deviation of an actual operation of the hydraulic excavator 1 with respect to the operation plan information.

Specifically, as shown in an enlarged view of FIG. 4, the trajectory deviation determining section 92 computes a shortest distance Dmin from the present position of the claw tip (specific point) P0 of the bucket 10 of the work device 1A which position is computed by the position and posture computing section 43 to the planned operation trajectory computed by the operation plan section 90. The trajectory deviation determining section 92 determines whether or not the shortest distance Dmin is equal to or less than a distance threshold value D0. The trajectory deviation determining section 92 determines that the specific point P0 of the bucket 10 does not deviate from the planned operation trajectory when the shortest distance Dmin is equal to or less than the distance threshold value D0. The trajectory deviation determining section 92 determines that the specific point P0 of the bucket 10 deviates from the planned operation trajectory when the shortest distance Dmin is more than the distance threshold value D0. As the distance threshold value D0, a value of approximately several tens of millimeters to several hundred millimeters, for example, is set in advance, and is stored in the nonvolatile memory 40*b*. Incidentally, the distance threshold value D0 may be set according to the kind of the automatic control.

The time deviation determining section 93 shown in FIG. 3 determines whether or not an actual operation time of the work device 1A deviates from a planned operation time at least during the execution of the automatic control. The time deviation determining section 93 determines whether or not the actual operation time of the hydraulic excavator 1 deviates from the planned operation time on the basis of the operation plan information generated by the operation plan section 90 and the computation result in the position and posture computing section 43. That is, the time deviation determining section 93 determines whether or not there is a temporal deviation of the actual operation of the hydraulic excavator 1 with respect to the operation plan information.

Specifically, as shown in the enlarged view of FIG. 4, the time deviation determining section 93 identifies a position on the planned operation trajectory which position is closest to the present position of the claw tip (specific point) P0 of the bucket 10 of the work device 1A which position is computed by the position and posture computing section 43. The identified position will hereinafter be written as an identified position P1. The time deviation determining section 93 computes, as a difference time td, the absolute value of a difference between a present time tc and a planned time the stored in association with the identified position P1 included in the operation plan information (td=|tc−te|). Incidentally, the present time tc is computed by a timer function of the controller 40. The time deviation determining section 93 determines whether or not the difference time td is equal to or less than a time threshold value t0. The time deviation determining section 93 determines that the actual operation time of the hydraulic excavator 1 does not deviate from the planned operation time when the difference time td is equal to or less than the time threshold value t0. The time deviation determining section 93 determines that the actual operation time of the hydraulic excavator 1 deviates from the planned operation time when the difference time td is more than the time threshold value t0. As the time threshold value t0, a value of approximately a few ten seconds to a few minutes, for example, is set in advance, and is stored in the nonvolatile memory 40*b*.

Referring to FIG. 3, description will be made of processing when the actual operation of the work device 1A deviates with respect to the operation plan information. When the trajectory deviation determining section 92 determines that the specific point of the work device 1A deviates from the planned operation trajectory during the execution of the automatic control, the automatic operation control section 91 ends the automatic control. Further, the automatic operation control section 91 generates a first abnormal end signal indicating that the automatic control is ended because the specific point of the work device 1A deviates from the planned operation trajectory. The second output section 111 outputs the first abnormal end signal generated by the automatic operation control section 91 to the management system 180.

When the time deviation determining section 93 determines that the actual operation time of the work device 1A deviates from the planned operation time during the execution of the automatic control, the automatic operation control section 91 ends the automatic control. Further, the automatic operation control section 91 generates a second abnormal end signal indicating that the automatic control is ended because the actual operation time of the work device 1A deviates from the planned operation time. The second output section 111 outputs the second abnormal end signal generated by the automatic operation control section 91 to the management system 180.

The automatic operation control section 91 determines whether or not the distance of a straight line connecting the position coordinates of a terminal end of the planned operation trajectory (that is, the position coordinates of the specific point at a planned end time of the task) to the present position coordinates of the specific point of the work device 1A which position coordinates are computed by the position and posture computing section 43 is equal to or less than an end determination threshold value. The automatic operation control section 91 determines that a task execution completion condition is satisfied and ends the automatic control when the distance of the straight line connecting the position coordinates of the terminal end of the planned operation trajectory to the position coordinates of the specific point of the work device 1A which position coordinates are computed by the position and posture computing section 43 is equal to or less than the end determination threshold value.

Further, the automatic operation control section 91 generates a normal end signal indicating that the automatic control is ended normally. That is, the automatic operation control section 91 generates the normal end signal when the automatic operation control section 91 ends the automatic control without the trajectory deviation determining section 92 determining that the specific point of the work device 1A deviates from the planned operation trajectory and without the time deviation determining section 93 determining that the actual operation time of the work device 1A deviates from the planned operation time. The second output section 111 outputs the normal end signal generated by the automatic operation control section 91 to the management system 180.

The automatic operation control section 91 determines whether or not a temporary stop request signal is input from the management system 180 to the third input section 102 during the execution of the automatic control. The automatic operation control section 91 temporarily stops the automatic control when the automatic operation control section 91 determines that a temporary stop request signal is input from the management system 180 to the third input section 102 during the execution of the automatic control. Further, the automatic operation control section 91 generates a temporary stop signal indicating that the automatic control is temporarily stopped. The second output section 111 outputs the temporary stop signal generated by the automatic operation control section 91 to the management system 180.

The automatic operation control section 91 determines whether or not a resumption request signal is input from the management system 180 to the third input section 102 during the temporary stop of the automatic control. The automatic operation control section 91 resumes the automatic control when the automatic operation control section 91 determines that a resumption request signal is input from the management system 180 to the third input section 102 during the temporary stop of the automatic control.

The automatic operation control section 91 determines whether or not a halfway termination request signal is input from the management system 180 to the third input section 102 during the temporary stop of the automatic control. The automatic operation control section 91 ends the automatic control when the automatic operation control section 91 determines that a halfway termination request signal is input from the management system 180 to the third input section 102 during the temporary stop of the automatic control. Further, the automatic operation control section 91 generates a halfway termination signal indicating that the automatic control is terminated halfway. The second output section 111 outputs the halfway termination signal generated by the automatic operation control section 91 to the management system 180.

—Flow of Processing of Automatic Operation Control—

Figure 5:
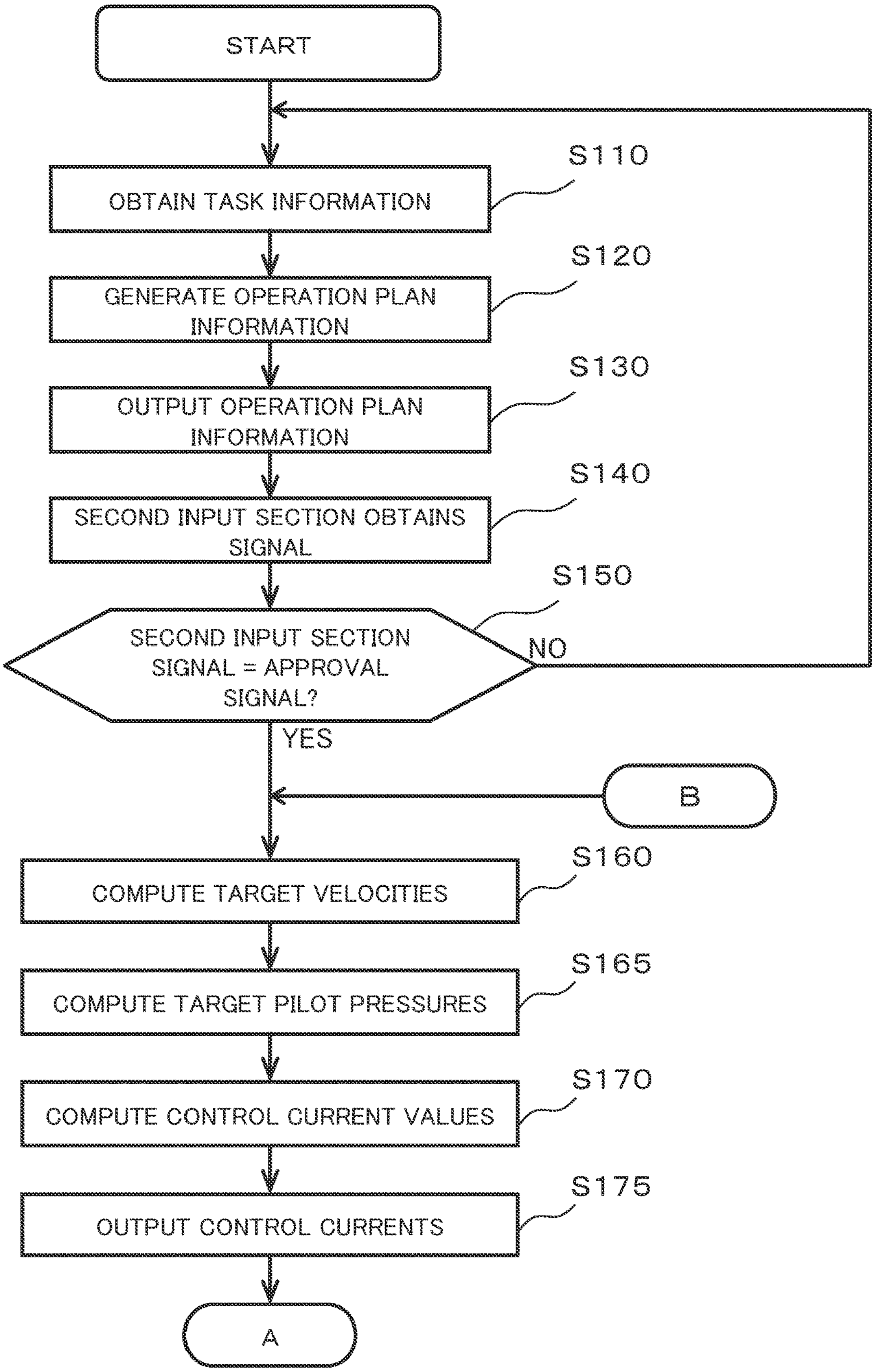
FIG. 5 is a flowchart of automatic operation control performed by the controller, and shows a flow from task information obtainment processing to control current output processing.
Figure 6:
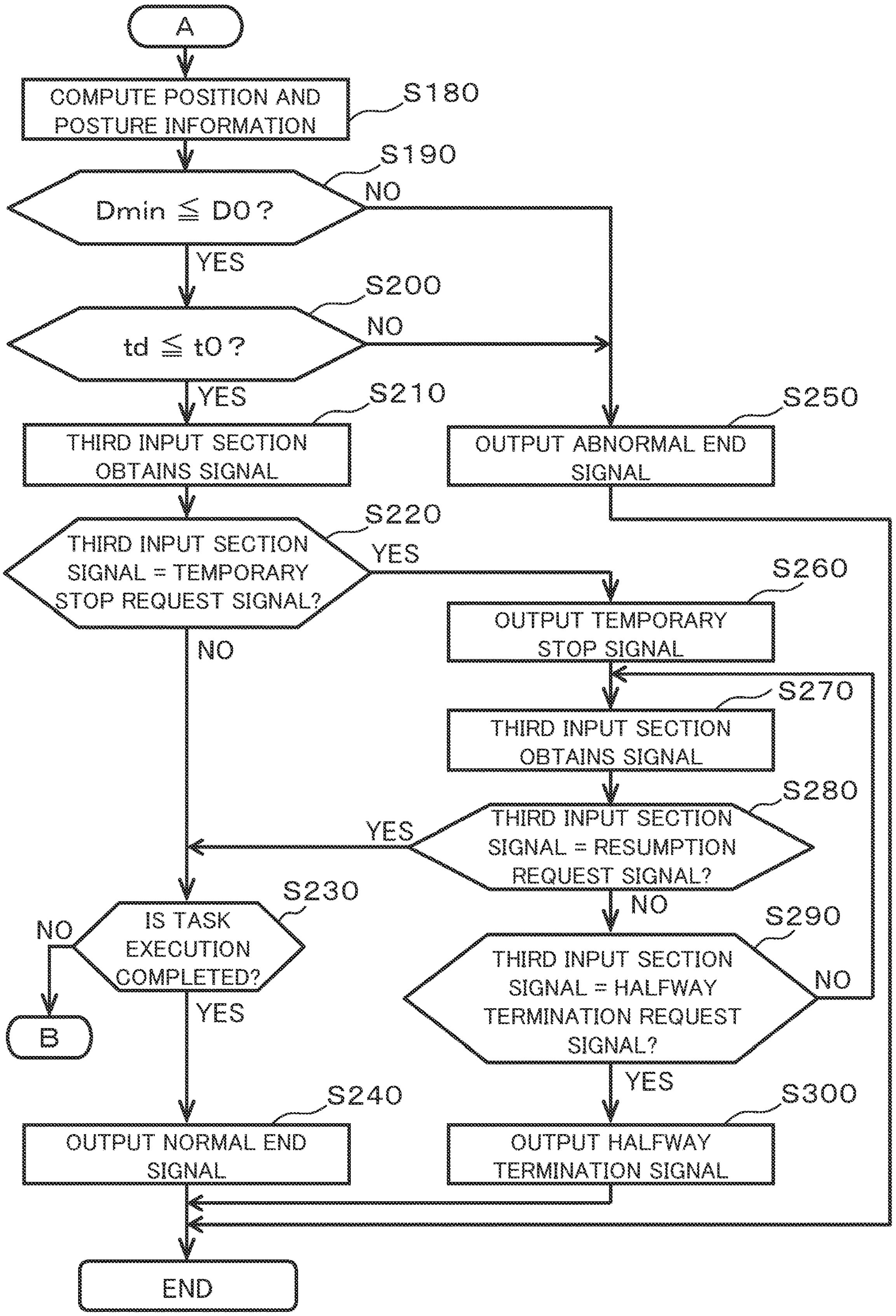
FIG. 6 is a flowchart of the automatic operation control performed by the controller, and shows a flow from position and posture information computation processing to end signal output processing.

Referring to FIG. 5 and FIG. 6, description will be made of an example of automatic operation control performed by the controller 40. A flowchart of FIG. 5 shows a flow from task information obtainment processing to control current output processing in the automatic operation control. A flowchart of FIG. 6 shows a flow from position and posture information computation processing to end signal output processing in the automatic operation control.

As shown in FIG. 5, in step S110, the first input section 100 obtains task information from the management system 180. The processing then proceeds to step S120. In step S120, the operation plan section 90 generates operation plan information on the basis of the task information obtained in step S110. The processing then proceeds to step S130. In step S130, the first output section 110 outputs the operation plan information generated in step S120 to the management system 180. The processing then proceeds to step S140.

In step S140, the second input section 101 obtains a signal from the management system 180 (which signal will hereinafter be also written as a second input section signal). The processing then proceeds to step S150. In step S150, the automatic operation control section 91 determines whether or not the second input section signal obtained in step S140 is an approval signal. The processing proceeds to step S160 when the automatic operation control section 91 determines in step S150 that the second input section signal is an approval signal. The processing returns to step S110 when the automatic operation control section 91 determines in step S150 that the second input section signal is not an approval signal (that is, determines that the second input section signal is a disapproval signal).

When a negative determination is made in step S150, the automatic control by the controller 40 (processing from step S160 on down) is not performed. When an affirmative determination is made in step S150, the automatic control by the controller 40 (processing from step S160 on down) is performed.

In step S160, the automatic operation control section 91 computes the target velocities of the respective hydraulic actuators on the basis of the present position and posture information of the hydraulic excavator 1 (present position and posture of the hydraulic excavator 1) as a computation result of the position and posture computing section 43 and the operation plan information. The processing then proceeds to step S165. Incidentally, the present position and posture information of the hydraulic excavator 1 is computed in step S180 to be described later, and is retained in the nonvolatile memory 40*b*. In step S165, the actuator control section 81 computes the target pilot pressures of the respective flow control valves D1 to D6 on the basis of the target velocities computed in step S160. The processing then proceeds to step S170.

In step S170, the solenoid proportional valve control section 44 computes control current values to be supplied to the solenoids of the respective solenoid proportional valves 54*a* to 59*b* on the basis of the target pilot pressures computed in step S170. The processing then proceeds to step S175. In step S175, the solenoid proportional valve control section 44 supplies control currents corresponding to computation results in step S170 to the solenoids of the solenoid proportional valves 54*a* to 59*b*. The processing then proceeds to step S180 (see FIG. 6).

As shown in FIG. 6, in step S180, the position and posture computing section 43 computes the present position of the machine body 1B in the geographic coordinate system and the present azimuth angle of the upper swing structure 12 on the basis of a sensing result of the machine body position sensor 36. In addition, in step S180, the position and posture computing section 43 computes the position and posture information of the hydraulic excavator 1 on the basis of the present position of the machine body 1B in the geographic coordinate system and the present azimuth angle of the upper swing structure 12, the sensing result of the posture sensor 50, and dimensional information of parts of the hydraulic excavator 1 which dimensional information is stored in the nonvolatile memory 40*b*. The processing then proceeds to step S190. The position and posture information of the hydraulic excavator 1 includes the position and posture of the work device 1A, the position and posture of the upper swing structure 12, and the position and posture of the lower track structure 11.

In step S190, the trajectory deviation determining section 92 performs trajectory deviation determination processing. In the trajectory deviation determination processing, the trajectory deviation determining section 92 computes the shortest distance Dmin between the position of the specific point of the work device 1A which position is included in a result of the computation in step S180 and the planned operation trajectory included in the operation plan information generated in step S120. Further, the trajectory deviation determining section 92 determines whether or not the shortest distance Dmin is equal to or less than the distance threshold value D0. The trajectory deviation determining section 92 determines that the specific point of the work device 1A does not deviate from the planned operation trajectory when the trajectory deviation determining section 92 determines in step S190 that the shortest distance Dmin is equal to or less than the distance threshold value D0. The processing then proceeds to step S200. The trajectory deviation determining section 92 determines that the specific point of the work device 1A deviates from the planned operation trajectory when the trajectory deviation determining section 92 determines in step S190 that the shortest distance Dmin is more than the distance threshold value D0. The processing then proceeds to step S250.

In step S200, the time deviation determining section 93 performs time deviation determination processing. In the time deviation determination processing, the time deviation determining section 93 identifies a position on the planned operation trajectory which position is closest to the position of the specific point of the work device 1A, the position of the specific point being included in the result of the computation in step S180. The time deviation determining section 93 computes, as a difference time td, the absolute value of a difference between the present time tc and the planned time the stored in association with the identified position included in the operation plan information. Further, the time deviation determining section 93 determines whether or not the difference time td is equal to or less than the time threshold value t0. The time deviation determining section 93 determines that the actual operation time of the hydraulic excavator 1 does not deviate from the planned operation time when the time deviation determining section 93 determines in step S200 that the difference time td is equal to or less than the time threshold value t0. The processing then proceeds to step S210. When the time deviation determining section 93 determines in step S200 that the difference time td is more than the time threshold value t0, the time deviation determining section 93 determines that the actual operation time of the hydraulic excavator 1 deviates from the planned operation time. The processing then proceeds to step S250.

In step S210, the third input section 102 obtains a signal from the management system 180 (which signal will hereinafter be also written as a third input section signal). The processing then proceeds to step S220. In step S220, the automatic operation control section 91 determines whether or not the third input section signal obtained in step S210 is a temporary stop request signal. When the automatic operation control section 91 determines in step S220 that the third input section signal is a temporary stop request signal, the processing proceeds to step S260. When the automatic operation control section 91 determines in step S220 that the third input section signal is not a temporary stop request signal, the processing proceeds to step S230.

In step S230, the automatic operation control section 91 determines whether or not the task execution completion condition is satisfied. When it is determined in step S230 that the task execution completion condition is satisfied, the processing proceeds to step S240. When it is determined in step S230 that the task execution completion condition is not satisfied, the processing proceeds to step S160 (see FIG. 5).

In step S240, the second output section 111 outputs a normal end signal to the management system 180. The automatic operation control is then ended. In step S250, the second output section 111 outputs an abnormal end signal to the management system 180. The automatic operation control is then ended. Incidentally, in step S250, the second output section 111 outputs a first abnormal end signal to the management system 180 when a negative determination is made in step S190, or the second output section 111 outputs a second abnormal end signal to the management system 180 when a negative determination is made in step S200.

In step S260, the second output section 111 outputs a temporary stop signal to the management system 180. The processing then proceeds to step S270. In step S270, the third input section 102 obtains a signal (third input section signal) from the management system 180. The processing then proceeds to step S280.

In step S280, the automatic operation control section 91 determines whether or not the third input section signal obtained in step S270 is a resumption request signal. When the automatic operation control section 91 determines in step S280 that the third input section signal is a resumption request signal, the processing proceeds to step S230. When the automatic operation control section 91 determines in step S280 that the third input section signal is not a resumption request signal, the processing proceeds to step S290.

In step S290, the automatic operation control section 91 determines whether or not the third input section signal obtained in step S270 is a halfway termination request signal. When the automatic operation control section 91 determines in step S290 that the third input section signal is a halfway termination request signal, the processing proceeds to step S300. When the automatic operation control section 91 determines in step S290 that the third input section signal is not a halfway termination request signal, the processing returns to step S270.

In step S300, the second output section 111 outputs a halfway termination signal to the management system 180. The automatic operation control is then ended.

Operations

A main operation of the hydraulic excavator 1 according to the present embodiment will be described. In the following, a main operation of the hydraulic excavator 1 will be described by taking as an example a case where the kind of the automatic control is excavation work.

In the example shown in FIG. 4, when the hydraulic excavator 1 is in a stop state S1, the claw tip of the bucket 10 is positioned at a starting point of the excavation work. In the stop state S1, when the manager performs an input operation for task information by the input device 185, the management server 181 generates the task information, and transmits the task information to the hydraulic excavator 1. The controller 40 of the hydraulic excavator 1 generates operation plan information on the basis of the input task information (S110 in FIGS. 5→S120). The controller 40 transmits the generated operation plan information to the management system 180 (S130 in FIG. 5).

The management server 181 displays the input operation plan information on the display device 184. The operation plan information output from the controller 40 to the management system 180 includes the planned operation trajectory as the trajectory of the specific point of the work device 1A, the time series information of the planned position of the work device 1A, the time series information of the planned posture of the work device 1A, and the time series information of the planned position of the machine body 1B. Thus, before the automatic control is performed by the hydraulic excavator 1, the manager can check the operation plan information, and determine whether or not to make the automatic control based on the operation plan information performed.

For example, the management server 181 generates a composite image in which an image of a line representing the planned operation trajectory and a terrain profile image are superimposed on each other when the planned operation trajectory is input to the management server 181, and the management server 181 outputs the composite image to the display device 184. Consequently, the composite image of the image of the line representing the planned operation trajectory and the terrain profile image is displayed on the display screen of the display device 184. By visually checking the composite image displayed on the display screen of the display device 184, the manager can check the operation plan information before the automatic control is performed by the hydraulic excavator 1. The manager performs a disapproval operation by the input device 185 when the manager determines that an operation based on the operation plan information is not desired to be performed. When the disapproval operation is performed by the input device 185, the management server 181 generates a disapproval signal, and transmits the disapproval signal to the hydraulic excavator 1. Thus, the manager can check the operation plan information in advance, and therefore prevent an operation not intended by the manager from being performed by the hydraulic excavator 1.

A display mode of the operation plan information is not limited to a mode in which the composite image of the image of the line representing the planned operation trajectory and the terrain profile image is displayed on the display screen of the display device 184, but the display mode can be various display modes. For example, the management server 181 may display the time series information of the planned position of the work device 1A which time series information is included in the operation plan information in a table format or a graph format on the display screen of the display device 184. In addition, the management server 181 may display an animation of the hydraulic excavator 1 on the display screen of the display device 184 on the basis of the time series information of the planned posture of the work device 1A which time series information is included in the operation plan information by a well-known key frame method or the like. Incidentally, when the automatic control includes vehicle movement, the management server 181 displays, for example, a composite image of an image of a line representing a planned movement trajectory of the machine body 1B and the terrain profile image on the display screen of the display device 184 on the basis of the time series information of the planned position of the machine body 1B.

The manager performs an input operation for new task information when the manager has performed the disapproval operation. Thus, the controller 40 generates new operation plan information based on the new task information, and outputs the new operation plan information to the management system 180 (S140 in FIG. 5→No in S150→S110→S120→S130), so that the new operation plan information is displayed on the display screen of the display device 184. the manager performs an approval operation by the input device 185 when the manager determines that there is no problem in the operation plan information. When the approval operation is performed by the input device 185, the management server 181 generates an approval signal, and transmits the approval signal to the hydraulic excavator 1.

the controller 40 performs the automatic control of the hydraulic excavator 1 on the basis of the operation plan information when the approval signal is input to the controller 40 (S140 in FIG. 5→Yes in S150∝S160→ . . . →S180 in FIG. 6→Yes in S190→Yes in S200→S210→No in S220→No in S230). When the kind of the automatic control is excavation work, the controller 40 performs the automatic control of each hydraulic actuator (5, 6, and 7) such that the claw tip of the bucket 10 moves along the planned operation trajectory.

As shown in FIG. 4, in a state S2 in which the automatic control is being performed (which state will hereinafter be written also as an automatic control state), the controller 40 monitors whether or not the actual operation of the hydraulic excavator 1 deviates with respect to the operation plan information. An area indicated by hatching in FIG. 4 is an area enclosed by an upper boundary obtained by offsetting the planned operation trajectory upward by the distance threshold value D0 and a lower boundary obtained by offsetting the planned operation trajectory downward by the distance threshold value D0 (which area will hereinafter be written as an allowable area).

The automatic control is stopped when the claw tip as the specific point of the bucket 10 moves from within the allowable area to outside the allowable area, that is, when the distance between the specific point of the bucket 10 and the planned operation trajectory becomes more than the distance threshold value D0, due to an effect of soil to be excavated or the like during the automatic control state S2 (No in S190 in FIG. 6→S250→END). Therefore, according to the present embodiment, an operation not approved by the manager can be prevented from being performed.

Incidentally, when the automatic control is stopped, an abnormal end signal is output from the controller 40 to the management system 180 (S250 in FIG. 6). As a result, an image of a message or the like indicating that the automatic control is stopped because the claw tip of the bucket 10 deviates from the planned operation trajectory is displayed on the display screen of the display device 184. Therefore, the manager can recognize the stopping of the automatic control and a reason for the stopping of the automatic control, so that the manager can utilize them for the generation of next task information.

The automatic control is stopped when the difference between the actual operation time of the bucket 10 and the planned operation time becomes more than the time threshold value t0 due to an effect of soil to be excavated or the like during the automatic control state S2 (No in S200 in FIGS. 6→S250→END). Hence, according to the present embodiment, an operation not approved by the manager can be prevented from being performed.

Incidentally, when the automatic control is stopped, an abnormal end signal is output from the controller 40 to the management system 180 (S250 in FIG. 6). As a result, an image of a message or the like indicating that the automatic control is stopped because the actual operation time of the work device 1A deviates from the planned operation time is displayed on the display screen of the display device 184. Thus, the manager can recognize the stopping of the automatic control and a reason for the stopping of the automatic control, so that the manager can utilize them for the generation of next task information. For example, such a work with a delay can be prevented from being performed repeatedly, and therefore the delaying of work by the automatic control can be prevented.

When the manager desires to stop the automatic control of the hydraulic excavator 1 temporarily for some reason during the automatic control state S2, the manager performs a temporary stop request operation by the input device 185. When the temporary stop request operation is performed by the input device 185, the management server 181 generates a temporary stop request signal, and transmits the temporary stop request signal to the hydraulic excavator 1. The controller 40 stops the automatic control when the temporary stop request signal is input to the controller 40 (S210 in FIG. 6→Yes in S220→S260→S270→No in S280→No in S290).

Incidentally, when the controller 40 temporarily stops the automatic control, the controller 40 outputs a temporary stop signal to the management system 180 (S260 in FIG. 6). As a result, an image such as a message indicating that the automatic control is temporarily stopped is displayed on the display screen of the display device 184. Thus, the manager can confirm that the automatic control is temporarily stopped.

When the manager desires to resume the automatic control during a temporary stop state, the manager performs a resumption request operation by the input device 185. When the resumption request operation is performed by the input device 185, the management server 181 generates a resumption request signal, and transmits the resumption request signal to the hydraulic excavator 1. The controller 40 resumes the automatic control when the resumption request signal is input to the controller 40 (S270 in FIG. 6→Yes in S280→No in S230→S160 in FIG. 5→ . . . ).

When the manager desires to terminate the automatic control halfway during the temporary stop state, the manager performs a halfway termination request operation by the input device 185. When the halfway termination request operation is performed by the input device 185, the management server 181 generates a halfway termination request signal, and transmits the halfway termination request signal to the hydraulic excavator 1. The controller 40 terminates the automatic control halfway when the halfway termination request signal is input to the controller 40 (S270 in FIG. 6→No in S280→Yes in S290→S300→END).

Incidentally, when the controller 40 terminates the automatic control halfway, the controller 40 outputs a halfway termination signal to the management system 180 (S300 in FIG. 6). As a result, an image such as a message indicating that the automatic control is terminated halfway is displayed on the display screen of the display device 184. Therefore, the manager can confirm that the automatic control is terminated halfway.

When the automatic control is ended without such a determination that the specific point of the work device 1A deviates from the planned operation trajectory and without such a determination that the actual operation time of the work device 1A deviates from the planned operation time, a normal end signal is output from the controller 40 to the management system 180, and the hydraulic excavator 1 is set in a stop state S3 (Yes in S230 in FIGS. 6→S240→END).

According to the foregoing embodiment, the following advantages are produced.

(1) The hydraulic excavator (work machine) 1 according to the present embodiment includes: the work device 1A; the posture sensor 50 that senses the posture information of the work device 1A; a hydraulic actuator (3*a*, 3*b*, 4, 5, 6, and 7) that drives the work device 1A; and the controller (controller) 40 configured to generate the operation plan information on the basis of the task information necessary for the automatic control, the task information being obtained from the management system (external system) 180, and perform the automatic control of the hydraulic actuator on the basis of the operation plan information and a sensing result of the posture sensor 50. The controller 40 outputs the operation plan information to the management system 180. The controller 40 does not perform the automatic control when an approval signal indicating that the operation plan information is approved is not input from the management system 180. The controller 40 performs the automatic control when the approval signal is input from the management system 180.

With this configuration, when the controller 40 presents the operation plan information of the hydraulic excavator 1 to the management system 180 and obtains the approval signal from the management system 180, the controller 40 performs the automatic control according to the operation plan information. On the other hand, the controller 40 does not perform the automatic control according to the operation plan information when the controller 40 does not obtain the approval signal from the management system 180. Therefore, according to the present embodiment, automatic control not intended by the manager can be prevented from being performed. That is, according to the present embodiment, it is possible to provide the hydraulic excavator 1 that can appropriately perform an operation intended by the manager.

(2) The operation plan information includes the planned operation trajectory as the trajectory of the specific point of the work device 1A. The controller 40 determines whether or not the specific point of the work device 1A deviates from the planned operation trajectory during the execution of the automatic control. The controller 40 stops the automatic control, and outputs an abnormal end signal to the management system 180 when the controller 40 determines that the specific point of the work device 1A deviates from the planned operation trajectory during the execution of the automatic control.

With this configuration, the automatic control is stopped when the specific point of the work device 1A deviates from the planned operation trajectory, so that an operation of the hydraulic excavator 1 which operation is not intended by the manager can be prevented from being performed. In addition, the controller 40 can present information indicating that the automatic control is ended abnormally to the management system 180. Therefore, the manager can recognize that the automatic control is ended abnormally.

(3) The controller 40 determines whether or not the actual operation time of the work device 1A deviates from the planned operation time during the execution of the automatic control. When the controller 40 determines that the actual operation time of the work device 1A deviates from the planned operation time during the execution of the automatic control, the controller 40 ends the automatic control, and outputs an abnormal end signal to the management system 180.

With this configuration, the automatic control is stopped when the actual operation time of the work device 1A deviates from the planned operation time, so that an operation of the hydraulic excavator 1 which operation is not intended by the manager can be prevented from being performed. For example, it is possible to prevent taking a longer operation time than an operation time intended by the manager. In addition, the controller 40 can present information indicating that the automatic control is ended abnormally to the management system 180. Therefore, the manager can recognize that the automatic control is ended abnormally.

(4) The controller 40 outputs a normal end signal to the management system 180 when the controller 40 ends the automatic control without determining that the specific point of the work device 1A deviates from the planned operation trajectory and without determining that the actual operation time of the work device 1A deviates from the planned operation time. Thus, the controller 40 can present information indicating that the automatic control is ended normally to the management system 180. Therefore, the manager can recognize a state in which an input operation for next task information can be performed.

(5) The controller 40 temporarily stops the automatic control and outputs a temporary stop signal to the management system 180 when a temporary stop request signal is input from the management system 180 to the controller 40 during the execution of the automatic control. Thus, the manager can temporarily stop the automatic control by outputting the temporary stop request signal from the management system 180 when the manager desires to stop the automatic control temporarily for some reason. In addition, the controller 40 can present information indicating that the automatic control is temporarily stopped to the management system 180. Therefore, the manager can recognize a state in which the automatic control is temporarily stopped.

(6) The controller 40 resumes the automatic control when a resumption request signal is input from the management system 180 to the controller 40 during the temporary stop of the automatic control. The controller 40 ends the automatic control and outputs a halfway termination signal to the management system 180 when a halfway termination request signal is input from the management system 180 to the controller 40 during the temporary stop of the automatic control. Thus, the manager can resume the automatic control by outputting the resumption request signal from the management system 180 after temporarily stopping the automatic control. In addition, the manager can terminate the automatic control halfway by outputting the halfway termination request signal from the management system 180 when the manager desires to terminate the automatic control halfway. Further, the controller 40 can present information indicating that the automatic control is terminated halfway to the management system 180. Therefore, the manager can recognize that the automatic control is terminated halfway.

(7) The controller 40 computes the position of the machine body 1B on the basis of a sensing result of the machine body position sensor 36, and on the basis of a result of the computation and a sensing result of the posture sensor 50, computes the position and posture of the work device 1A. According to this configuration, the position and posture of the work device 1A in the geographic coordinate system, for example, can be computed, and therefore the automatic control based on the operation plan information in the geographic coordinate system can be performed. Incidentally, while in the present embodiment, description has been made of an example in which the controller 40 computes both of the position and posture of the work device 1A, it suffices for the controller 40 to compute at least one of the position and posture of the work device 1A. The controller 40 can perform the automatic control on the basis of at least one of the position and posture of the work device 1A and the operation plan information.

(8) The operation plan information output from the controller 40 to the management system 180 includes the planned operation trajectory as the trajectory of the specific point of the work device 1A, the time series information of the planned position of the work device 1A, the time series information of the planned posture of the work device 1A, and the time series information of the planned position of the machine body 1B. Hence, the management system 180 can display, on the display device 184, the planned operation trajectory, the time series information of the planned position of the work device 1A, the time series information of the planned posture of the work device 1A, and the time series information of the planned position of the machine body 1B.

Second Embodiment

Figure 7:
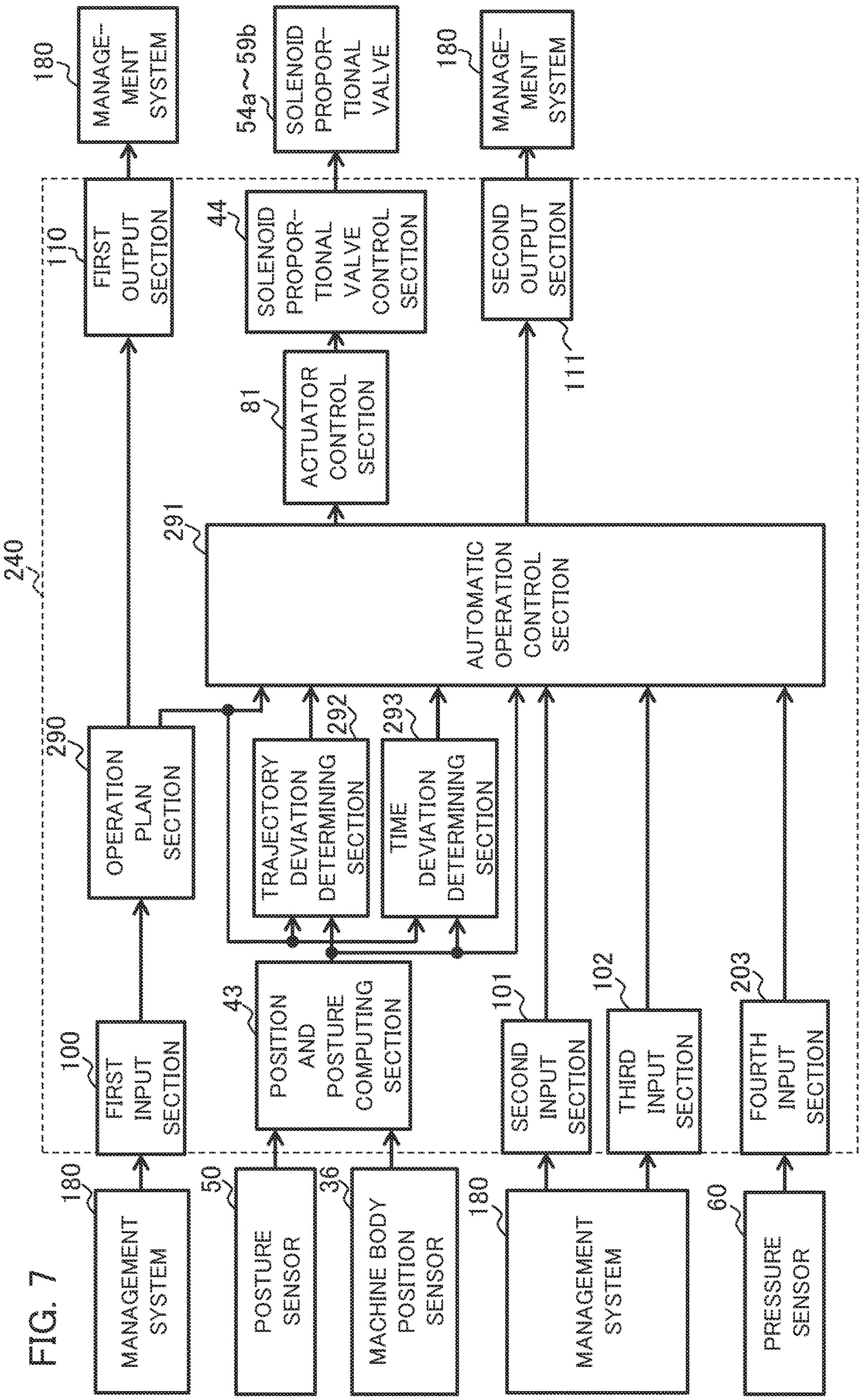
FIG. 7 is a functional block diagram of a controller according to a second embodiment of the present invention.
Figure 8:
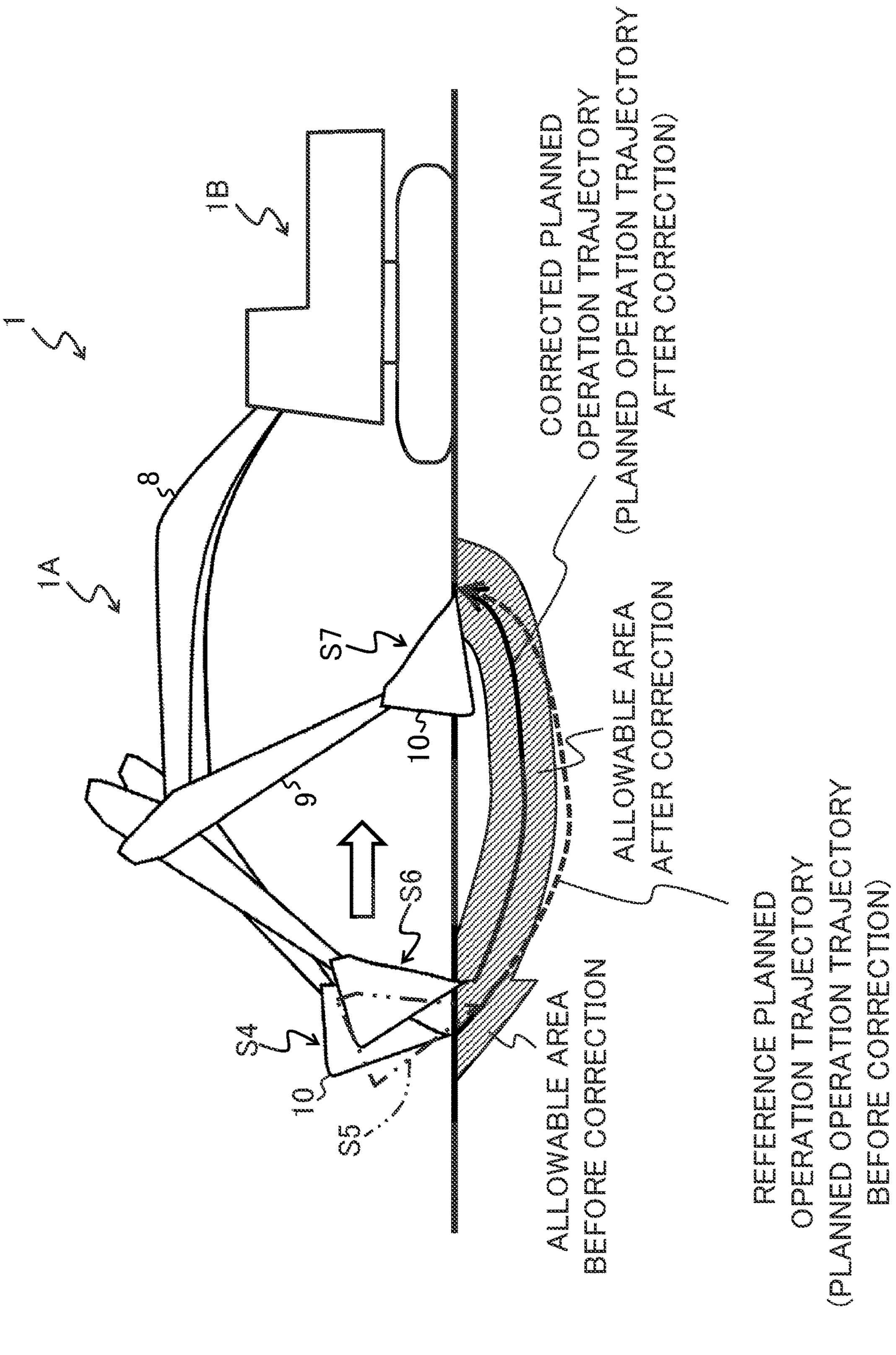
FIG. 8 is a diagram showing a planned operation trajectory when excavation work is performed as well as the work device in which the claw tip of the bucket operates so as to follow the planned operation trajectory, and shows a reference planned operation trajectory and a corrected planned operation trajectory as the planned operation trajectory.

Referring to FIG. 7 and FIG. 8, description will be made of a hydraulic excavator 1 according to a second embodiment of the present invention. Incidentally, in the figures, parts identical or corresponding to those of the first embodiment are identified by the same reference numerals, and differences will mainly be described. FIG. 7 is a diagram similar to FIG. 3, and is a functional block diagram of a controller 240 according to the second embodiment. FIG. 8 is a diagram similar to FIG. 4, and is a diagram showing the planned operation trajectory when excavation work is performed as well as the work device 1A in which the claw tip of the bucket 10 operates so as to follow the planned operation trajectory. FIG. 8 shows a reference planned operation trajectory and a corrected planned operation trajectory as the planned operation trajectory.

—Functions of Controller—

As shown in FIG. 7, an operation plan section 290 generates reference operation plan information and corrected operation plan information on the basis of the task information. The reference operation plan information corresponds to the operation plan information described in the first embodiment. The corrected operation plan information is information obtained by correcting the reference operation plan information, and is information different from the reference operation plan information.

The reference operation plan information includes a planned operation trajectory as the trajectory of the specific point of the work device 1A (which trajectory will hereinafter be written also as the reference planned operation trajectory), the time series information of the planned position of the work device 1A, the time series information of the planned posture of the work device 1A, and the time series information of the planned position of the machine body 1B. The corrected operation plan information includes a planned operation trajectory as the trajectory of the specific point of the work device 1A (which trajectory will hereinafter be written also as the corrected planned operation trajectory), the time series information of the planned position of the work device 1A, the time series information of the planned posture of the work device 1A, and the time series information of the planned position of the machine body 1B. Incidentally, the corrected planned operation trajectory is a trajectory different from the reference planned operation trajectory, and is also used to indicate a range in which there is a possibility of correcting the planned operation trajectory during the execution of the automatic control, as will be described later.

An automatic operation control section 291 determines whether or not a correction condition is satisfied during the execution of the automatic control. The automatic operation control section 291 performs reference automatic control of the hydraulic actuator on the basis of the reference operation plan information and the sensing result of the posture sensor 50 when the correction condition is not satisfied. The automatic operation control section 291 performs corrected automatic control of the hydraulic actuator on the basis of the corrected operation plan information and the sensing result of the posture sensor 50 when the correction condition is satisfied.

The correction condition is, for example, set in advance so as to be satisfied when the soil to be excavated is harder than expected. The correction condition can be, for example, set as a condition that is satisfied when a state in which any one of the pressures of the hydraulic cylinders (5, 6, and 7) is equal to or higher than a pressure threshold value continues for a predetermined period of time or more.

Description will be made of an example of processing of determining whether or not the correction condition is satisfied during the automatic control of the excavation work. The controller 240 includes a fourth input section 203. A sensing result of a pressure sensor 60 is input to the fourth input section 203. The pressure sensor 60 includes a plurality of pressure sensors that sense the pressures of bottom side oil chambers of the hydraulic cylinders (5, 6, and 7) and the pressures of rod side oil chambers of the hydraulic cylinders (5, 6, and 7).

The automatic operation control section 291 determines that the correction condition is satisfied when a state in which any one of the pressures of the bottom side oil chambers of the hydraulic cylinders (5, 6, and 7) and the pressures of the rod side oil chambers of the hydraulic cylinders (5, 6, and 7) is equal to or higher than the pressure threshold value continues for the predetermined period of time or more. The automatic operation control section 291 determines that the correction condition is not satisfied when the state in which any one of the pressures of the bottom side oil chambers of the hydraulic cylinders (5, 6, and 7) and the pressures of the rod side oil chambers of the hydraulic cylinders (5, 6, and 7) is equal to or higher than the pressure threshold value does not continue for the predetermined period of time or more.

A trajectory deviation determining section 292 determines whether or not the specific point of the work device 1A deviates from the reference planned operation trajectory at least during the execution of the reference automatic control. In addition, the trajectory deviation determining section 292 determines whether or not the specific point of the work device 1A deviates from the corrected planned operation trajectory at least during the execution of the corrected automatic control.

A time deviation determining section 293 determines whether or not the actual operation time of the work device 1A deviates from the planned operation time at least during the execution of the reference automatic control and during the execution of the corrected automatic control.

When the trajectory deviation determining section 292 determines that the specific point of the work device 1A deviates from the reference planned operation trajectory during the execution of the reference automatic control, the automatic operation control section 291 ends the reference automatic control, and generates a first abnormal end signal. Further, the second output section 111 outputs the first abnormal end signal to the management system 180.

When the trajectory deviation determining section 292 determines that the specific point of the work device 1A deviates from the corrected planned operation trajectory during the execution of the corrected automatic control, the automatic operation control section 291 ends the corrected automatic control, and generates a first abnormal end signal. Further, the second output section 111 outputs the first abnormal end signal to the management system 180.

When the time deviation determining section 293 determines that the actual operation time of the work device 1A deviates from the planned operation time during the execution of the reference automatic control, the automatic operation control section 291 ends the reference automatic control, and generates a second abnormal end signal. Further, the second output section 111 outputs the second abnormal end signal to the management system 180.

When the time deviation determining section 293 determines that the actual operation time of the work device 1A deviates from the planned operation time during the execution of the corrected automatic control, the automatic operation control section 291 ends the corrected automatic control, and generates a second abnormal end signal. Further, the second output section 111 outputs the second abnormal end signal to the management system 180.

The automatic operation control section 291 generates a normal end signal when the automatic operation control section 291 ends the reference automatic control without the trajectory deviation determining section 292 determining that the specific point of the work device 1A deviates from the reference planned operation trajectory and without the time deviation determining section 293 determining that the actual operation time of the work device 1A deviates from the planned operation time. Further, the second output section 111 outputs the normal end signal to the management system 180.

The automatic operation control section 291 generates a normal end signal when the automatic operation control section 291 ends the corrected automatic control without the trajectory deviation determining section 292 determining that the specific point of the work device 1A deviates from the corrected planned operation trajectory and without the time deviation determining section 293 determining that the actual operation time of the work device 1A deviates from the planned operation time. Further, the second output section 111 outputs the normal end signal to the management system 180.

Operation

A main operation of the hydraulic excavator 1 according to the present embodiment will be described. In the following, a main operation of the hydraulic excavator 1 will be described by taking as an example a case where the kind of the automatic control is excavation work.

As shown in FIG. 8, in a stop state S4, the claw tip of the bucket 10 is positioned at a starting point of the excavation work. In the stop state S4, when the manager performs an input operation for task information by the input device 185, the management server 181 generates the task information, and transmits the task information to the hydraulic excavator 1. The controller 240 of the hydraulic excavator 1 generates operation plan information on the basis of the input task information. The controller 240 transmits the generated operation plan information to the management system 180.

The management server 181 displays the input operation plan information on the display device 184. In the present second embodiment, the operation plan information includes the reference operation plan information generated on the basis of the task information and the corrected operation plan information obtained by correcting the reference operation plan information. The management server 181 displays, on the display screen of the display device 184, a range in which there is a possibility of correcting the planned operation trajectory during the execution of the automatic control. The range in which there is a possibility of correcting the planned operation trajectory during the execution of the automatic control is, for example, a range enclosed by the reference planned operation trajectory and the corrected planned operation trajectory. Incidentally, when a plurality of corrected planned operation trajectories are computed, a range enclosed by the planned operation trajectory and a corrected planned operation trajectory most separated from the planned operation trajectory is the range in which there is a possibility of correcting the planned operation trajectory during the execution of the automatic control. Thus, before the automatic control is performed by the hydraulic excavator 1, the manager can check the operation plan information including the corrected operation plan information, and determine whether or not to make the automatic control based on the operation plan information performed. The manager performs a disapproval operation by the input device 185 when the manager determines that an operation based on the operation plan information is not desired to be performed. The manager performs an approval operation by the input device 185 when the manager determines that there is no problem in the operation plan information. When the approval operation is performed by the input device 185, the management server 181 generates an approval signal, and transmits the approval signal to the hydraulic excavator 1.

The controller 240 performs the reference automatic control of the hydraulic excavator 1 on the basis of the reference operation plan information when the approval signal is input to the controller 240. When the kind of the automatic control is excavation work, the controller 240 performs the reference automatic control of each hydraulic actuator (5, 6, and 7) such that the claw tip of the bucket 10 moves along the reference planned operation trajectory.

In a state S5 in which the reference automatic control is performed (which state will hereinafter be written also as a reference automatic control state), the controller 240 monitors whether or not the actual operation of the hydraulic excavator 1 deviates with respect to the reference operation plan information. The reference automatic control is stopped when the actual operation of the hydraulic excavator 1 deviates with respect to the reference operation plan information during the reference automatic control state S5.

When the correction condition is satisfied during the reference automatic control state S5, the controller 240 performs the corrected automatic control of each hydraulic actuator (5, 6, and 7) such that the claw tip of the bucket 10 moves along the corrected planned operation trajectory. When a state transition is made from the reference automatic control state S5 to a state S6 in which the corrected automatic control is performed (which state will hereinafter be written also as a corrected automatic control state), an allowable area corresponding to the corrected planned operation trajectory is set.

In the corrected automatic control state S6, the controller 240 monitors whether or not the actual operation of the hydraulic excavator 1 deviates with respect to the corrected operation plan information. The corrected automatic control is stopped when the actual operation of the hydraulic excavator 1 deviates with respect to the corrected operation plan information during the corrected automatic control state S6.

When the corrected automatic control is ended without such a determination that the specific point of the work device 1A deviates from the corrected planned operation trajectory and without such a determination that the actual operation time of the work device 1A deviates from a corrected planned operation time, a normal end signal is output from the controller 240 to the management system 180, and the hydraulic excavator 1 is set in a stop state S7.

Such a second embodiment can provide advantages similar to the advantages described in the first embodiment.

The controller 240 according to the second embodiment presents the operation plan information including a range in which there is a possibility of correcting the planned operation trajectory, and performs the automatic control according to the operation plan information when an approval signal is obtained from the management system 180. On the other hand, the controller 240 does not perform the automatic control according to the operation plan information when the controller 240 does not obtain the approval signal from the management system 180. Therefore, according to the present embodiment, automatic control not intended by the manager can be prevented from being performed. That is, according to the present second embodiment, as in the first embodiment, it is possible to provide the hydraulic excavator 1 that can appropriately perform an operation intended by the manager.

Further, the present second embodiment corrects the operation trajectory appropriately according to conditions, and can therefore improve work efficiency. For example, when the soil to be excavated is harder than expected by the manager, the automatic control of excavation work according to the corrected planned operation trajectory assuming hard soil is performed. Therefore, as compared with a case where the automatic control of excavation work according to the reference planned operation trajectory is performed when the soil to be excavated is hard, accuracy of the excavation work can be improved, and work efficiency can be improved by preventing the work from being performed again.

Incidentally, in the present second embodiment, the controller 240 stops the reference automatic control and outputs an abnormal end signal to the management system 180 when the controller 240 determines that the specific point of the work device 1A deviates from the reference planned operation trajectory or that the actual operation time of the work device 1A deviates from the planned operation time during the execution of the reference automatic control. Similarly, the controller 240 stops the corrected automatic control and outputs an abnormal end signal to the management system 180 when the controller 240 determines that the specific point of the work device 1A deviates from the corrected planned operation trajectory or that the actual operation time of the work device 1A deviates from the planned operation time during the execution of the corrected automatic control. The controller 240 outputs a normal end signal to the management system 180 when the controller 240 ends the reference automatic control without determining that the specific point of the work device 1A deviates from the reference planned operation trajectory and without determining that the actual operation time of the work device 1A deviates from the planned operation time. Similarly, the controller 240 outputs a normal end signal to the management system 180 when the controller 240 ends the corrected automatic control without determining that the specific point of the work device 1A deviates from the corrected planned operation trajectory and without determining that the actual operation time of the work device 1A deviates from the planned operation time. Hence, the present second embodiment can provide advantages similar to those of (2) to (4) described in the first embodiment even when not only the reference automatic control but also the corrected automatic control is performed.

The following modifications are also within the scope of the present invention. It is possible to combine a configuration illustrated in a modification and a configuration described in a foregoing embodiment with each other, combine configurations described in the foregoing different embodiments with each other, or combine configurations described in following different modifications with each other.

First Modification

In the foregoing embodiments, description has been made of an example in which the specific point of the work device 1A is a central point in the left-right width direction at the claw tip of the bucket 10. However, the present invention is not limited to this. A left end point and a right end point of the claw tip of the bucket 10 may each be the specific point of the work device 1A. In addition, the position of the specific point of the bucket 10 may be changed according to the kind of the automatic control. For example, when work of pressing the back surface of the bucket 10 against an inclined wall surface by operating the arm 9 so as to separate the arm 9 from the machine body 1B and leveling the ground by thus solidifying soil is performed by the automatic control, a point on the back surface of the bucket 10 is preferably set as the specific point of the work device 1A.

Second Modification

In the foregoing embodiments, description has been made of an example in which the hydraulic excavator 1 includes the machine body position sensor 36. However, the present invention is not limited to this. The hydraulic excavator 1 may not include the machine body position sensor 36. In this case, it suffices to define the operation plan information and the positional information of each part of the hydraulic excavator 1 in an excavator reference coordinate system.

Third Modification

In the foregoing embodiments, description has been made of an example in which the operation plan information output from the controller 40 or 240 to the management system 180 includes the planned operation trajectory as the trajectory of the specific point of the work device 1A, the time series information of the planned position of the work device 1A, the time series information of the planned posture of the work device 1A, and the time series information of the planned position of the machine body 1B. However, at least any one of these pieces of information may be included in the operation plan information. For example, when the kind of the automatic control is work that does not involve vehicle movement, it suffices for the operation plan information to include at least any one of the planned operation trajectory as the trajectory of the specific point of the work device 1A, the time series information of the planned position of the work device 1A, and the time series information of the planned posture of the work device 1A. In addition, when the kind of the automatic control is vehicle movement, it suffices for the operation plan information to include the time series information of the planned position of the machine body 1B.

Fourth Modification

In the foregoing embodiments, description has been made of an example in which the posture sensor 50 includes the angle sensors (30, 31, and 32) as the posture sensors that sense the posture information of the boom 8, the arm 9, and the bucket 10. However, the present invention is not limited to this. The posture sensor 50 may include stroke sensors that sense stroke amounts of the hydraulic cylinders (5, 6, and 7) as the posture information in place of the angle sensors (30, 31, and 32). The position and posture computing section 43 computes the boom angle, the arm angle, and the bucket angle on the basis of the stroke amounts of the hydraulic cylinders (5, 6, and 7).

Fifth Modification

In the foregoing embodiments, description has been made of an example in which the controllers 40 and 240 determine whether or not there is a positional and a temporal deviation of the actual operation of the hydraulic excavator 1 with respect to the operation plan information, and stop the automatic control when there is a deviation. However, the present invention is not limited to this. The controllers 40 and 240 may, for example, determine whether or not there is a positional or a temporal deviation of the actual operation of the hydraulic excavator 1 with respect to the operation plan information, and stop the automatic control when there is a deviation. In addition, the processing of determining a deviation of the actual operation of the hydraulic excavator 1 with respect to the operation plan information and the processing of stopping the automatic control on the basis of a result of the determination can be omitted.

Sixth Modification

In the foregoing embodiments, description has been made of an example in which the work machine is the hydraulic excavator 1 having the bucket 10. However, the present invention is not limited to this. For example, the present invention may be applied to work machines having attachments other than the bucket. In addition, the work machine is not limited to a case where the work machine is a crawler type hydraulic excavator. For example, the present invention can be applied to various work machines such as a wheeled hydraulic excavator, and a wheel loader. In addition, the work machine is not limited to movable work machines. For example, the present invention can be applied also to a work machine having a swing structure provided to a machine body of a fixed type, and having an articulated work device provided to the swing structure.

Embodiments of the present invention have been described above. However, the foregoing embodiments merely represent a part of examples of application of the present invention, and are not intended to limit the technical scope of the present invention to specific configurations of the foregoing embodiments.

DESCRIPTION OF REFERENCE CHARACTERS

1: Hydraulic excavator (work machine)
1A: Work device
1B: Machine body
2: Main pump
3*a*, 3*b*: Travelling hydraulic motor (hydraulic actuator)
4: Swing hydraulic motor (hydraulic actuator)
5: Boom cylinder (hydraulic actuator)
6: Arm cylinder (hydraulic actuator)
7: Bucket cylinder (hydraulic actuator)
8: Boom
9: Arm
10: Bucket
11: Lower track structure
12: Upper swing structure
30, 31, 32, 33: Angle sensor (posture sensor)
36: Machine body position sensor
40: Controller (controller)
43: Position and posture computing section
44: Solenoid proportional valve control section
50: Posture sensor
51: Communicating device
60: Pressure sensor
81: Actuator control section
90: Operation plan section
91: Automatic operation control section
92: Trajectory deviation determining section
93: Time deviation determining section
100: First input section
101: Second input section
102: Third input section
110: First output section
111: Second output section
180: Management system (external system)
181: Management server
182: Storage device
183: Communicating device
184: Display device
185: Input device
203: Fourth input section
240: Controller (controller)
290: Operation plan section
291: Automatic operation control section
292: Trajectory deviation determining section
293: Time deviation determining section

The invention claimed is:

1. A work machine comprising:

a work device;

a posture sensor that senses posture information of the work device;

a hydraulic actuator that drives the work device; and a controller configured to generate operation plan information in advance on a basis of task information necessary for automatic control, the task information being obtained from an external system, and perform the automatic control of the hydraulic actuator on a basis of the operation plan information and a sensing result of the posture sensor, wherein the operation plan information includes reference operation plan information pre-generated on the basis of the task information and corrected operation plan information pre-generated by correcting the reference operation plan information, the reference operation plan information includes a reference planned operation trajectory as a trajectory of a specific point of the work device when the automatic control is an excavation work, the corrected operation plan information includes a range in which there is a possibility of correcting the reference planned operation trajectory during execution of the automatic control, the range being enclosed by the reference planned operation trajectory and a corrected planned operation trajectory as a trajectory of the specific point of the work device that is different from the reference planned operation trajectory, and the controller is configured to:

display the operation plan information including the reference operation plan information and the corrected operation plan information to on a display device of the external system before performing the automatic control;

not perform the automatic control when an approval signal indicating that the operation plan information is approved is not input from the external system;

perform the automatic control when the approval signal is input from the external system;

determine whether or not a correction condition is satisfied based on whether a state in which a pressure of the hydraulic actuator is equal to or higher than a threshold value continues for a predetermined period of time or more during the execution of the automatic control;

perform reference automatic control of the hydraulic actuator on a basis of the reference operation plan information and the sensing result of the posture sensor when the correction condition is not satisfied, such that the specific point of the work device moves along the reference planned operation trajectory; and perform corrected automatic control of the hydraulic actuator on a basis of the corrected operation plan information and the sensing result of the posture sensor when the correction condition is satisfied, such that the specific point of the work device moves along the corrected planned operation trajectory.

2. The work machine according to claim 1, further comprising:

a machine body position sensor that senses positional information of a machine body to which the work device is attached;

wherein the controller is configured to compute a position of the machine body on a basis of a sensing result of the machine body position sensor, and on a basis of a result of the computation and the sensing result of the posture sensor, compute at least any one of a position and a posture of the work device.

3. The work machine according to claim 1, wherein the controller is configured to:

determine whether or not the specific point of the work device deviates from the reference planned operation trajectory or the corrected planned operation trajectory during execution of the reference automatic control or the corrected automatic control;

end the reference automatic control or the corrected automatic control and output an abnormal end signal to the external system when determining that the specific point of the work device deviates from the reference planned operation trajectory or the corrected planned operation trajectory during the execution of the reference automatic control or the corrected automatic control; and output a normal end signal to the external system when ending the reference automatic control or the corrected automatic control without determining that the specific point of the work device deviates from the reference planned operation trajectory or the corrected planned operation trajectory.

4. The work machine according to claim 1, wherein the controller is configured to:

determine whether or not an actual operation time of the work device deviates from a planned operation time during execution of the automatic control;

end the automatic control and output an abnormal end signal to the external system when determining that the actual operation time of the work device deviates from the planned operation time during the execution of the automatic control; and output a normal end signal to the external system when ending the automatic control without determining that the actual operation time of the work device deviates from the planned operation time.

5. The work machine according to claim 1, wherein the controller is configured to temporarily stop the automatic control and output a temporary stop signal to the external system when a temporary stop request signal is input from the external system during execution of the automatic control.

6. The work machine according to claim 5, wherein the controller is configured to:

resume the automatic control when a resumption request signal is input from the external system during a temporary stop of the automatic control; and end the automatic control and output a halfway termination signal to the external system when a halfway termination request signal is input from the external system during the temporary stop of the automatic control.

* * * * *